United States Patent
Pikalo et al.

(10) Patent No.: US 7,627,126 B1
(45) Date of Patent: Dec. 1, 2009

(54) SYSTEMS AND METHODS FOR IMPLEMENTING PATH LENGTH CONTROL FOR QUANTUM CRYPTOGRAPHIC SYSTEMS

(75) Inventors: Oleksiy Pikalo, Belmont, MA (US);
John D. Schlafer, Wayland, MA (US);
Brig B. Elliot, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 821 days.

(21) Appl. No.: 10/716,078

(22) Filed: Nov. 18, 2003

Related U.S. Application Data

(63) Continuation-in-part of application No. 10/271,103, filed on Oct. 15, 2002.

(60) Provisional application No. 60/456,852, filed on Mar. 21, 2003.

(51) Int. Cl.
*H04L 9/08* (2006.01)
*H04K 1/00* (2006.01)
*H04L 9/32* (2006.01)
*G01C 19/68* (2006.01)
*G02B 27/14* (2006.01)

(52) U.S. Cl. .................... 380/279; 380/256; 713/168; 356/473; 359/637

(58) Field of Classification Search .............. 380/258
See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,157,461 A * | 10/1992 | Page | 356/462 |
| 5,243,649 A | 9/1993 | Franson | 380/9 |
| 5,307,410 A | 4/1994 | Bennett | |
| 5,311,572 A | 5/1994 | Friedes et al. | |
| 5,325,397 A | 6/1994 | Scholz et al. | |
| 5,339,182 A | 8/1994 | Kimble et al. | 359/112 |
| 5,400,325 A | 3/1995 | Chatwani et al. | |
| 5,414,771 A | 5/1995 | Fawcett, Jr. | 380/44 |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |

(Continued)

FOREIGN PATENT DOCUMENTS

WO    WO 96/07951    3/1996

(Continued)

OTHER PUBLICATIONS

Galindo et al., "Information and computation: Classical and quantum aspects," May 8, 2002, http://prola.aps.org/.*

(Continued)

*Primary Examiner*—Nasser G Moazzami
*Assistant Examiner*—Oscar A Louie
(74) *Attorney, Agent, or Firm*—Ropes & Gray LLP

(57) ABSTRACT

A quantum cryptographic key distribution (QKD) endpoint (405) includes a QKD receiver and a feedback system (1600). The QKD receiver receives symbols transmitted over a QKD path. The feedback system (1600) controls a length of the QKD path based on the received symbols.

28 Claims, 26 Drawing Sheets

U.S. PATENT DOCUMENTS

| | | | |
|---|---|---|---|
| 5,602,916 | A | 2/1997 | Grube et al. |
| 5,675,648 | A | 10/1997 | Townsend .................... 380/21 |
| 5,710,773 | A | 1/1998 | Shiga |
| 5,720,608 | A | 2/1998 | Aoki et al. |
| 5,729,608 | A | 3/1998 | Janson et al. |
| 5,732,139 | A | 3/1998 | Lo et al. ........................ 380/28 |
| 5,757,912 | A | 5/1998 | Blow .......................... 380/21 |
| 5,764,765 | A | 6/1998 | Phoenix et al. ............... 380/21 |
| 5,764,767 | A | 6/1998 | Beimel et al. |
| 5,768,378 | A | 6/1998 | Townsend et al. ............. 380/21 |
| 5,768,391 | A | 6/1998 | Ichikawa |
| 5,805,801 | A | 9/1998 | Holloway et al. |
| 5,850,441 | A | 12/1998 | Townsend et al. ............. 380/21 |
| 5,911,018 | A | 6/1999 | Bischel et al. |
| 5,953,421 | A | 9/1999 | Townsend .................... 380/21 |
| 5,960,131 | A | 9/1999 | Fouquet et al. |
| 5,960,133 | A | 9/1999 | Tomlinson |
| 5,966,224 | A | 10/1999 | Hughes et al. ............... 359/112 |
| 6,005,993 | A | 12/1999 | MacDonald |
| 6,028,935 | A | 2/2000 | Rarity et al. ................. 380/21 |
| 6,052,465 | A | 4/2000 | Gotoh et al. |
| 6,097,696 | A | 8/2000 | Doverspike |
| 6,122,252 | A | 9/2000 | Aimoto et al. |
| 6,130,780 | A | 10/2000 | Joannopoulos et al. |
| 6,145,024 | A | 11/2000 | Maezawa et al. |
| 6,151,586 | A | 11/2000 | Brown |
| 6,154,586 | A | 11/2000 | MacDonald et al. |
| 6,160,627 | A * | 12/2000 | Ahn et al. .................... 356/477 |
| 6,160,651 | A | 12/2000 | Chang et al. |
| 6,188,768 | B1 | 2/2001 | Bethune et al. |
| 6,208,935 | B1 | 3/2001 | Yamada et al. |
| 6,233,075 | B1 | 5/2001 | Chang et al. |
| 6,233,393 | B1 | 5/2001 | Yanagihara et al. |
| 6,272,548 | B1 | 8/2001 | Cotter et al. |
| 6,289,104 | B1 | 9/2001 | Patterson et al. |
| 6,341,127 | B1 | 1/2002 | Katsube et al. |
| 6,378,072 | B1 | 4/2002 | Collins et al. |
| 6,430,345 | B1 * | 8/2002 | Dultz et al. ................. 385/122 |
| 6,438,234 | B1 * | 8/2002 | Gisin et al. ................. 380/256 |
| 6,463,060 | B1 | 10/2002 | Sato et al. |
| 6,507,012 | B1 | 1/2003 | Medard et al. |
| 6,519,062 | B1 | 2/2003 | Yoo |
| 6,522,749 | B2 | 2/2003 | Wang |
| 6,529,498 | B1 | 3/2003 | Cheng |
| 6,532,543 | B1 | 3/2003 | Smith et al. |
| 6,538,990 | B1 | 3/2003 | Prorock |
| 6,539,410 | B1 | 3/2003 | Klass |
| 6,556,544 | B1 | 4/2003 | Lee |
| 6,560,707 | B2 | 5/2003 | Curtis |
| 6,563,796 | B1 | 5/2003 | Saito |
| 6,594,055 | B2 | 7/2003 | Snawerdt |
| 6,605,822 | B1 | 8/2003 | Blais et al. |
| 6,646,727 | B2 | 11/2003 | Saleh et al. |
| 6,647,010 | B1 | 11/2003 | Ford et al. |
| 6,650,805 | B2 | 11/2003 | Chen et al. |
| 6,654,346 | B1 | 11/2003 | Mahalingaiah et al. |
| 6,661,806 | B1 | 12/2003 | Eriksson et al. |
| 6,678,379 | B1 | 1/2004 | Mayers et al. |
| 6,684,335 | B1 | 1/2004 | Epstein et al. |
| 6,720,589 | B1 | 4/2004 | Shields |
| 6,721,269 | B2 | 4/2004 | Cao et al. |
| 6,728,281 | B1 | 4/2004 | Santori et al. |
| 6,748,434 | B2 | 6/2004 | Kavanagh |
| 6,754,214 | B1 | 6/2004 | Mahalingaiah |
| 6,778,557 | B1 | 8/2004 | Yuki et al. |
| 6,799,270 | B1 | 9/2004 | Bull et al. |
| 6,801,626 | B1 | 10/2004 | Nambu |
| 6,836,463 | B2 | 12/2004 | Garcia-Luna-Aceves |
| 6,862,564 | B1 | 3/2005 | Shue et al. |
| 6,873,797 | B2 | 3/2005 | Chang et al. |
| 6,882,431 | B2 | 4/2005 | Teich et al. |
| 6,895,091 | B1 | 5/2005 | Elliot et al. |
| 6,895,092 | B2 | 5/2005 | Tomita |
| 6,897,434 | B1 | 5/2005 | Kumar et al. |
| 6,934,472 | B2 | 8/2005 | Chang et al. |
| 6,986,056 | B1 | 1/2006 | Dultz et al. |
| 7,028,059 | B2 | 4/2006 | Williams |
| 7,035,411 | B2 | 4/2006 | Azuma et al. |
| 7,068,790 | B1 | 6/2006 | Elliott |
| 7,512,242 | B2 | 3/2009 | Pearson et al. |
| 2001/0038695 | A1 | 11/2001 | Kim |
| 2002/0015573 | A1 | 2/2002 | Ishibashi |
| 2002/0021467 | A1 | 2/2002 | Ofek et al. |
| 2002/0025041 | A1 | 2/2002 | Tomita |
| 2002/0097874 | A1 | 7/2002 | Foden et al. |
| 2002/0110245 | A1 | 8/2002 | Gruia |
| 2002/0141019 | A1 | 10/2002 | Chang et al. |
| 2003/0002074 | A1 | 1/2003 | Miyano |
| 2003/0002670 | A1 * | 1/2003 | Wang .......................... 380/52 |
| 2003/0002674 | A1 | 1/2003 | Nambu et al. |
| 2003/0059157 | A1 | 3/2003 | DeCusatis et al. |
| 2003/0137944 | A1 | 7/2003 | Medvinsky |
| 2003/0180042 | A1 | 9/2003 | Nelles et al. |
| 2003/0215088 | A1 | 11/2003 | Bao |
| 2003/0231771 | A1 | 12/2003 | Gisin et al. |
| 2004/0005056 | A1 | 1/2004 | Nishioka et al. |
| 2004/0008843 | A1 | 1/2004 | Van Enk |
| 2004/0019676 | A1 | 1/2004 | Iwatsuki et al. |
| 2004/0032954 | A1 | 2/2004 | Bonfrate et al. |
| 2004/0109564 | A1 | 6/2004 | Cerf et al. |
| 2004/0136321 | A1 | 7/2004 | Ren et al. |
| 2004/0165884 | A1 | 8/2004 | Al-Chalabi |
| 2004/0190725 | A1 | 9/2004 | Yuan et al. |
| 2005/0036624 | A1 | 2/2005 | Kent et al. |
| 2005/0094818 | A1 | 5/2005 | Inoue et al. |
| 2006/0059343 | A1 | 3/2006 | Berzanskis et al. |
| 2006/0252381 | A1 | 11/2006 | Sasaoka et al. |

FOREIGN PATENT DOCUMENTS

| | | |
|---|---|---|
| WO | WO 02/05480 | 1/2002 |

OTHER PUBLICATIONS

Merolla et al., "Quantum cryptographic device using single-photon phase modulation," Sep. 1999, http://prola.aps.org/.*

Tittel et al., "Quantum Cryptography Using Entangled Photons in Energy-Time Bell States," Nov. 29, 1999, http://prola.aps.org/.*

"Practical quantum key distribution over a 48-km optical fiber network," Hughes et al., Los Alamos National Laboratory, Apr. 8, 1999, http://arxiv.org/abs/quant-ph/9904038.*

"Violations of a New Inequality for classical Fields"; J.D. Franson; The Johns Hopkins University, Applied Physics Laboratory; 1991; pp. 23-32.

"Quantum Cryptography Defies Eavesdropping"; Collins, Graham; Physics Today; Nov. 1992; pp. 21-23.

"Quantum Public Key Distribution System"; IBM Technical Disclosure Bulletin; vol. 28, No. 7; Dec. 7, 1985; pp. 3153-3163.

"Single Photon Interference in 10 km Long Optical Fibre Interferometer"; P.D. Townsend et al.; Electronics Letters; vol. 29, No. 7; Apr. 1993; pp. 834-835.

"Enhanced Single Photon Fringe Visibility in a 10 km-Long Prototype Quantum Cryptography Channel"; P.D. Townsend et al.; Electronics Letters; vol. 29, No. 14; Jul. 1993; pp. 1291-1293.

"Secure Key Distribution System Based on Quantum Cryptography"; P.D. Townsend et al.; Electronics Letters; vol. 30, No. 10; May 1994; pp. 809-811.

Multi-User Quantum Cryptography on Optical Networks; Simon J.D. Phoenix et al.; Journal of Modern Optics; vol. 42, No. 6; Jun. 1995; pp. 1155-1163.

"Secret-Key Reconciliation by Public Discussion"; Gilles Brassard et al.; Department IRO, Universite de Montreal; 1994;14 pages.

"Quantum Cryptography: Public Key Distribution and Coin Tossing"; Charles H. Bennett et al; International Conference on Computers, Systems & Signal Processing; Dec. 10-12, 1984; 5 pages.

U.S. Appl. No. 09/943,709, filed Aug. 31, 2001; Brig Barnum Elliott; Systems and Methods for Path Set-Up in a Quantum Key Distribution Network; 48 pages.

U.S. Appl. No. 10/271,103, filed Oct. 15, 2001; Oleksiy Pikalo et al.; Systems and Methods for Framing Quantum Cryptographic Links; 54 pages.

U.S. Appl. No. 09/944,328, filed Aug. 31, 2001; Brig Barnum Elliott; Quantum Cryptographic Key Distribution Networks with Untrusted Switches; 35 pages.

Brig B. Elliott et al.: "Path-Length control in a interferometric QKD link," Proc. of SPIE, vol. #5105, Apr. 21, 2003, 11 pages.

Office action issued on Mar. 31, 2005 in U.S. Appl. No. 09/943,709.

Office action issued on Oct. 6, 2005 in U.S. Appl. No. 09/943,709.

Office action issued on Oct. 5, 2005 in U.S. Appl. No. 09/944,328.

Office action issued on Nov. 17, 2006 in U.S. Appl. No. 09/944,328.

Office action issued on Feb. 15, 2006 in U.S. Appl. No. 10/271,103.

Office action issued on Aug. 8, 2006 in U.S. Appl. No. 10/271,103.

Office action issued on Nov. 26, 2007 in U.S. Appl. No. 10/716,747.

Awduche, D., et al., Multi-protocol Lambda Switching: Issues in Combining MPLS Traffic Engineering Control with Optical Cross-connects, IETF Internet Draft Memo, http://www.ietf.org/shadow.html, Feb. 2000, p. 1-9.

Bennett, C., et al., "Quantum Cryptography: Public Key Distribution and Coin Tossing," Intl. Conf. on Computers, Systems and Signal Processing, Bangalore, India, Dec. 10-12, 1984, 5 pages.

Bethune, D.S., et al., An Autocompensating Fiber-Optic Quantum Cryptography System Based on Polarization Splitting of Light, IEEE Journal of Quantum Electronics, 36(3):340-347 2000.

Bethune, D.S., et al., "Prototype Autocompensating Quantum Cryptography System based on Polarization Splitting of Light," Session QC41, CCOMP/CCP99: Quantum Computing and Cryptography, Mar. 24, 1999, 4 pages.

Cabello, A., "Multiparty key distribution and secret sharing based on entanglement swapping," pp. 1-8, 2000.

Collins, G. "Quantum Cryptography Defies Eavesdropping," Physics Today, pp. 21-23, Nov. 1992.

Crepeau, C., et al., "Secure Multi-party Quantum Computation," ACM, pp. 1-10, 2001.

Degermark, M., et al., "Small Forwarding Tables for Fast Routing Lookups," ACM, pp. 3-14, 1997.

Eisenberg et al., "Lucent Technologies names Cherry Murray Physical Sciences Research Vice President," http://www.lucent.com/press/0300/000328.bla.html, Released Mar. 28, 2000, 2 pages.

Ekert, A.K., "Quantum Cryptography Based on Bell's Theorem," The American Physical Society, Physical Review Letters, vol. 67, No. 6, pp. 661-663, 1991.

Elliott, C., "Building the quantum network," New Journal of Physics vol. 4, No. 46, pp. 1-10, Jul. 2002.

Estrin, D., et al., "Security Issues in Policy Routing," IEEE, pp. 183-193, 1989.

Franson, J.D., "Violations of a New Inequality for Classical Fields," Johns Hopkins University, NTIS NASA publication, Goddard Space Flight Center, Workshop on Squeezed States and Uncertainty Relations, pp. 23-32, 1992.

Garcia-Luna-Aceves, J.J., et al., "Distributed, Scalable Routing Based on Vectors of Link States," IEEE Journal on Selected Areas in Communications, vol. 13, No. 8, pp. 1383-1395, Oct. 1995.

Garcia-Luna-Aceves, J.J., et al., "Scalable Link-State Internet Routing," Network Protocols, pp. 1-10, Oct. 1998.

Gisin, N., et al., "Quantum cryptography and long distance Bell experiments: How to control decoherence," Geneva, Switzerland, pp. 1-7 and 4 pages of drawings Jan. 1999.

Gisin, N., "Quantum Cryptography on Noisy Channels: Quantum versus Classical Key-Agreement Protocols," The American Physical Society, Physical Review Letters, vol. 83, No. 20, pp. 4200-4203, Nov. 1999.

Gottesman, D., et al., "Secure quantum key distribution using squeezed states," The American Physical Society, Physical Review A, vol. 63, No. 2, 18 pages, Jan. 2001.

Honjo, T., et al., "Differential-phase-shift Quantum Key Distribution," NTT Technical Review, vol. 2, No. 12, pp. 26-33, Dec. 2004.

Huang, N., "A Novel IP-Routing Lookup Scheme and Hardware Architecture for Multigigabit Switching Routers," IEEE Journal on Selected Areas in Communication, vol. 17, No. 6, pp. 1093-1104, Jun. 1999.

"Laser End-Point Detection System", IBM Technical Disclosure Bulletin, vol. 28, No. 7, pp. 3151-3163, Dec. 1985.

Imamoglu, A., et al., "Turnstile Device for Heralded Single Photons: Coulomb Blockade of Electron and Hole Tunneling in Quantum Confined p-i-n Heterojunctions," The American Physical Society, Physical Review Letters, vol. 72, No. 2, pp. 210-213, Jan. 1994.

Jennewein, T., et al., "Quantum Cryptography with Entangled Photons," The American Physical Society, Physical Review Letters, vol. 84, No. 20, pp. 4729-4732, May 2000.

Lakshman, T. V., et al., "High-Speed Policy-based Packet Forwarding Using Efficient Multidimensional Range Matching," ACM, pp. 203-214, 1998.

Lampson, B., et al., "IP Lookups Using Multiway and Multicolumn Search," IEEE/ACM Transactions on Networking, vol. 7, No. 3, pp. 324-334, Jun. 1999.

Lin, L.Y. et al., "Free-Space Micromachined Optical Switches for Optical Networking," IEEE Journal of Selected Topics in Quantum Electronics, vol. 5, No. 1, Jan./Feb. 1999.

Liu, S., et al., "A Practical Protocol For Advantage Distillation and Information Reconciliation," Kluwer Academic Publishers, vol. 30, No. 1, pp. 39-62, Aug. 2003.

Maurer, U., et al., "Information-Theoretic Key Agreement: From Weak to Strong Secrecy for Free," Proceedings of EUROCRYPT 2000, Lecture Notes in Computer Science, vol. 1807, pp. 351-368, Springer-Verlag, 2000.

Maurer, U.M., et al., "Unconditionally Secure Key Agreement and The Intrinsic Conditional Information," IEEE Transactions on Information Theory, vol. 45, No. 2, pp. 499-514, Mar. 1999.

Mo, X., et al., "Intrinsic-Stabilization Uni-Directional Quantum Key Distribution Between Beijing and Tianjin," Optics letters 30, 2632, 7 pages, 4 figures, 2005.

Naik, D.S., et al., "Entangled State Quantum Cryptography: Eavesdropping on the Ekert Protocol," The American Physical Society, Physical Review Letters, vol. 84, No. 20, pp. 4733-4736, May 2000.

Nambu, Y., et al., "BB84 Quantum Key Distribution System based on Silica-Based Planar Lightwave Circuits," Jpn. J. Appl. Phys. vol. 43, No. 8B, 11 pages, 2 figures, 2004.

Paniccia, M., "Silicon Integrated Photonics," UCSB, 30 pages, Feb. 2005.

Phoenix et al, "Multi-User Quantum Cryptography on Optical Networks," Journal of Modern Optics, vol. 42, No. 6, pp. 1155-1163, 1995.

"Quantum Public Key Distribution System," IBM Technical Disclosure Bulletin, vol. 28, No. 7, pp. 3153-3163, Dec. 1985.

Ramanathan, R., et al., "Hierarchically-organized, multihop mobile wireless networks for quality-of-service support," Mobile Networks and Applications, vol. 3, pp. 101-119, 1998.

Ribordy, G., et al., "Long-distance entanglement-based quantum key distribution," The American Physical Society, Physical Review A, vol. 63, 12 pages, 2001.

Rosen et al., "Multiprotocol Label Switching Architecture," RFC3031, Internet Standards Track Protocol, Internet Official Protocol Standards (STD 1), pp. 1-61, Jan. 2001.

Scarani, V., et al., "Quantum cryptography protocols robust against photon number splitting attacks," ERATO Conference on Quantum Information Science 2003, Sep. 2003, Niijimakaikan, Kyoto Japan; 2 pages.

Scarani, V., et al., "Quantum cryptography protocols robust against photon number splitting attacks for Weak Laser Pulse Implementations," The American Physical Society, Physical Review Letters, vol. 92, No. 5, Feb. 2004.

Schneier, B., "Applied Cryptography," Second Edition, Chapter 10, Wiley & Sons, Inc., pp. 216-220, Oct. 1995.

Slutsky, B., et al., "Defense frontier analysis of quantum cryptographic systems," Applied Optics, vol. 37, No. 14, pp. 2869-2878, May 1998.

Stucki, D., et al., "Quantum Key Distribution over 67 km with a plug&play system," New Journal of Physics, vol. 4, 8 pages, Jul. 2002.

Tanzilli, S., et al., "PPLN waveguide for quantum communication," The European Physical Journal D., vol. 18, pp. 155-160, 2002.

Tittel, W., et al., "Long-distance Bell-type tests using energy-time entangled photons," Physical Review A, vol. 59, No. 6, pp. 4150-4163, Jun. 1999.

Tomita, A., et al., "Recent Progress in Quantum Key Transmission," Fundamental Security Technologies, NEC J. of Adv. Tech., vol. 2, No. 1, pp. 84-91, 2005.

Townsend et al, "Enhanced Single Photon Fringe Visibility in a 10 km Long Prototype Quantum Cryptography Channel," Electronics Letters, vol. 29, No. 14, pp. 1291-1293, Apr. 1993.

Townsend et al., "Secure Key Distribution System Based on Quantum Cryptography," Electronics Letters, vol. 30, No. 10, pp. 809-811, 1994.

Townsend et al., "Single Photon Interference in 10 km Long Optical Fibre Interferometer," Electronics Letters, vol. 29, No. 7, pp. 834-835, Apr. 1993.

Tsai, W. T., et al., "An Adaptive Hierarchical Routing Protocol," IEEE Transactions on Computers, vol. 38, No. 8, pp. 1059-1075, Aug. 1989.

Waldvogel, M., et al., "Scalable High Speed IP Routing Lookups," ACM SIGCOMM Computer Communication Review, vol. 7, Issue 4, pp. 25-36, 1997.

Walker, James "Telecommunications Applications of MEMS," mstnews, pp. 6-9, 2000.

Xiao, L., et al., "Efficient Multi-Party Quantum Secret Sharing Schemes," Physical Review A., vol. 69, 7 pages, May 2004.

Zhang, Xian-Mo and Zhen, Yuliang, "Cryptographically Resilient Functions," IEEE Transactions on Information Theory, vol. 43, No. 5, pp. 1740-1747, Sep. 1997. Found at: http://ieeexplore.ieee.org/iel3/18/13537/00623184.pdf?tp=&arnumber=623184&isnumber=13517.

Basak, D., et al., "Multi-protocol Lambda Switching: Issues in Combining MPLS Traffic Engineering Control With Optical Cross-connects," Internet draft, 9 pages, (Aug. 2000).

Bennett, C.H., et al., "Generalized Privacy Amplification," IBM Research, 24 pages (May 31, 1995).

Bennett, C.H. et al., "Experimental Quantum Cryptography,", Journal of Cryptography's special issue after Eurocrypt '90, 28 pages, Sep. 1991.

Bennett, C. et al., "Quantum Cryptography: Public Key Distribution and Coin Tossing"; International Conference on Computers, Systems & Signal Processing; Dec. 10-12, 1984; 5 pages.

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Brassard, G., et al., "Cryptology Column—25 Years of Quantum Cryptography," Pragocrypt, pp. 13-24 (Jul. 1996).

Butler, W.T., et al. "Free space quantum-key distribution," Physical Review A, 57(4):2379-2382 (Apr. 1998).

Franson, J.D., "Bell Inequality for Position and Time," Physical Review Letters, 62(19):2205-2208 (May 1989).

Gisin, N., et al., "Quantum cryptography," Reviews of Modern Physics, 74:145-195 (2002).

Jacobs, B.C., et al., "Quantum cryptography in free space," Optics Letters, 21(22):1854-1856 (Nov. 1996).

Maurer, U.M., "Secret Key Agreement by Public Discussion From Common Information," appeared in IEEE Transactions on Information Theory, 39:733-742 (1993).

Office Action issued for U.S. Appl. No. 10/716,078 on Sep. 26, 2007.
Office Action issued for U.S. Appl. No. 10/786,314 on Oct. 29, 2007.
Office Action issued for U.S. Appl. No. 10/795,398 on Oct. 11, 2007.
Office Action issued for U.S. Appl. No. 10/799,177 on Mar. 27, 2008.
Office action issued for U.S. Appl. No. 10/803,509 on Sep. 6, 2007.
Office Action issued for U.S. Appl. No. 10/795,313 on Jul. 10, 2007.
Office Action issued for U.S. Appl. No. 10/218,652 on May 25, 2007.
Office action issued for U.S. Appl. No. 10/324,355 on Oct. 23, 2007.
Office action issued for U.S. Appl. No. 10/795,313 on Dec. 27, 2007.
U.S. Appl. No. 09/611,783; filed Jul. 7, 2000; entitled: "Systems and Methods for Implementing a Quantum-Cryptographic Communications Network," 43 pages.
Office Action issued Jun. 24, 2009 in U.S. Appl. No. 10/799,177.

* cited by examiner

COUNT TABLE 1300

| ALICE (V, B) 1305 | BOB ($B_R$) 1310 | $\Phi_0$ 1315 | BINNED COUNTS OF TRAINING EVENTS 1320 | | | |
|---|---|---|---|---|---|---|
| | | | NO D0, D1 HITS 1325 | D0 HIT 1330 | D1 HIT 1335 | D0 & D1 HITS 1340 |
| ROW = 1  (0,0) | 0 | 0 | | | | |
| ROW = 2  (0,0) | 1 | $3\pi/2$ | | | | |
| ROW = 3  (0,1) | 0 | $\pi/2$ | | | | |
| ROW = 4  (0,1) | 1 | 0 | | | | |
| ROW = 5  (1,0) | 0 | $\pi$ | | | | |
| ROW = 6  (1,0) | 1 | $\pi/2$ | | | | |
| ROW = 7  (1,1) | 0 | $3\pi/2$ | | | | |
| ROW = 8  (1,1) | 1 | $\pi$ | | | | |

COLUMN = 1   COLUMN = 2   COLUMN = 3   COLUMN = 4

JOINT PROBABILITY TABLE
1400

| B / A | EVENT B₀ 1425 | EVENT B₁ 1430 | EVENT B₂ 1435 | EVENT B₃ 1440 | MARGINAL PROBABILITY 1450 |
|---|---|---|---|---|---|
| EVENT $A_0$ 1405 | $P(A_0 \cap B_0)$ | $P(A_0 \cap B_1)$ | $P(A_0 \cap B_2)$ | $P(A_0 \cap B_3)$ | $P(A_0)$ |
| EVENT $A_1$ 1410 | $P(A_1 \cap B_0)$ | $P(A_1 \cap B_1)$ | $P(A_1 \cap B_2)$ | $P(A_1 \cap B_3)$ | $P(A_1)$ |
| EVENT $A_2$ 1415 | $P(A_2 \cap B_0)$ | $P(A_2 \cap B_1)$ | $P(A_2 \cap B_2)$ | $P(A_2 \cap B_3)$ | $P(A_2)$ |
| ... | ... | ... | ... | ... | ... |
| EVENT $A_7$ 1420 | $P(A_7 \cap B_0)$ | $P(A_7 \cap B_1)$ | $P(A_7 \cap B_2)$ | $P(A_7 \cap B_3)$ | $P(A_7)$ |
| MARGINAL PROBABILITY 1445 | $P(B_0)$ | $P(B_1)$ | $P(B_2)$ | $P(B_3)$ | $\sum = 1$ |

FIG. 14

SYSTEMS AND METHODS FOR IMPLEMENTING PATH LENGTH CONTROL FOR QUANTUM CRYPTOGRAPHIC SYSTEMS

CROSS REFERENCE TO RELATED APPLICATIONS

The instant application claims priority from provisional application No. 60/456,852, filed Mar. 21, 2003, the disclosure of which is incorporated by reference herein in its entirety.

The present application is a continuation-in-part of U.S. application Ser. No. 10/271,103, entitled "Systems and Methods for Framing Quantum Cryptographic Links" and filed Oct. 15, 2002, the disclosure of which is incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Project Agency (DARPA).

RELATED APPLICATIONS

The instant application is related to co-pending application Ser. No. 10/716,747, entitled "Systems and Methods for Implementing Training Frames for Quantum Cryptographic Links" and filed on a same date herewith, the disclosure of which is incorporated by reference herein in its entirety.

The present application further relates to co-pending U.S. patent application Ser. No. 09/943,709, entitled "Systems and Methods for Path Set-up in a Quantum Key Distribution Network" and filed Aug. 31, 2001; and U.S. patent application Ser. No. 09/944,328, entitled "Quantum Cryptographic Key Distribution Networks with Untrusted Switches" and filed Aug. 31, 2001, the disclosures of which are incorporated by reference herein.

FIELD OF THE INVENTION

The present invention relates generally to cryptographic systems and, more particularly, to systems and methods for implementing training frames for quantum cryptographic links.

BACKGROUND OF THE INVENTION

Within the field of cryptography, it is well recognized that the strength of any cryptographic system depends, among other things, on the key distribution technique employed. For conventional encryption to be effective, such as a symmetric key system, two communicating parties must share the same key and that key must be protected from access by others. The key must, therefore, be distributed to each of the parties. FIG. 1 shows one form of a conventional key distribution process. As shown in FIG. 1, for a party, Bob, to decrypt ciphertext encrypted by a party, Alice, Alice or a third party must share a copy of the key with Bob. This distribution process can be implemented in a number of conventional ways including the following: 1) Alice can select a key and physically deliver the key to Bob; 2) a third party can select a key and physically deliver the key to Bob; 3) if Alice and Bob both have an encrypted connection to a third party, the third party can deliver a key on the encrypted links to Alice and Bob; 4) if Alice and Bob have previously used an old key, Alice can transmit a new key to Bob by encrypting the new key with the old; and 5) Alice and Bob may agree on a shared key via a one-way mathematical algorithm, such as Diffie-Helman key agreement. All of these distribution methods are vulnerable to interception of the distributed key by an eavesdropper Eve, or by Eve "cracking" the supposedly one-way algorithm. Eve can eavesdrop and intercept or copy a distributed key and then subsequently decrypt any intercepted ciphertext that is sent between Bob and Alice. In conventional cryptographic systems, this eavesdropping may go undetected, with the result being that any ciphertext sent between Bob and Alice is compromised.

To combat these inherent deficiencies in the key distribution process, researchers have developed a key distribution technique called quantum cryptography. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, like Eve, from copying or intercepting a key that has been distributed from Alice to Bob without a significant probability of Bob's or Alice's discovery of the eavesdropping.

A well known quantum key distribution (QKD) scheme involves a quantum channel, through which Alice and Bob send keys using polarized or phase encoded photons, and a public channel, through which Alice and Bob send ordinary messages. Since these polarized or phase encoded photons are employed for QKD, they are often termed QKD photons. The quantum channel is a path, such as through air or an optical fiber, that attempts to minimize the QKD photons' interaction with the environment. The public channel may comprise a channel on any type of communication network such as a Public Switched Telephone network, the Internet, or a wireless network. An eavesdropper, Eve, may attempt to measure the photons on the quantum channel. Such eavesdropping, however, will induce a measurable disturbance in the photons in accordance with the Heisenberg uncertainty principle. Alice and Bob use the public channel to discuss and compare the photons sent through the quantum channel. If, through their discussion and comparison, they determine that there is no evidence of eavesdropping, then the key material distributed via the quantum channel can be considered completely secret.

FIGS. 2 and 3 illustrate a well-known scheme 200 for quantum key distribution in which the polarization of each photon is used for encoding cryptographic values. To begin the quantum key distribution process, Alice generates random bit values and bases 205 and then encodes the bits as polarization states (e.g., 0°, 45°, 90°, 135°) in sequences of photons sent via the quantum channel 210 (see row 1 of FIG. 3). Alice does not tell anyone the polarization of the photons she has transmitted. Bob receives the photons and measures their polarization along either a rectilinear or diagonal basis that is randomly selected with substantially equal probability. Bob records his chosen basis (see row 2 of FIG. 3) and his measurement results (see row 3 of FIG. 3). Bob and Alice discuss 215, via the public channel 220, which basis he has chosen to measure each photon. Bob, however, does not inform Alice of the result of his measurements. Alice tells Bob, via the public channel, whether he has made the measurement along the correct basis (see row 4 of FIG. 3). In a process called "sifting" 225, both Alice and Bob then discard all cases in which Bob has made the measurement along the wrong basis and keep only the ones in which Bob has made the measurement along the correct basis (see row 5 of FIG. 3).

Alice and Bob then estimate 230 whether Eve has eavesdropped upon the key distribution. To do this, Alice and Bob must agree upon a maximum tolerable error rate. Errors can occur due to the intrinsic noise of the quantum channel and eavesdropping attack by a third party. Alice and Bob choose randomly a subset of photons m from the sequence of photons that have been transmitted and measured on the same basis. For each of the m photons, Bob announces publicly his measurement result. Alice informs Bob whether his result is the same as what she had originally sent. They both then compute the error rate of the m photons and, since the measurement results of the m photons have been discussed publicly, the polarization data of the m photons are discarded. If the computed error rate is higher than the agreed upon tolerable error rate (typically no more than about 15%), Alice and Bob infer that substantial eavesdropping has occurred. They then discard the current polarization data and start over with a new sequence of photons. If the error rate is acceptably small, Alice and Bob adopt the remaining polarizations, or some algebraic combination of their values, as secret bits of a shared secret key 235, interpreting horizontal or 45 degree polarized photons as binary 0's and vertical or 135 degree photons as binary 1's (see row 6 of FIG. 3).

Alice and Bob may also implement an additional privacy amplification process 240 that reduces the key to a small set of derived bits to reduce Eve's knowledge of the key. If, subsequent to discussion 215 and sifting 225, Alice and Bob adopt n bits as secret bits, the n bits can be compressed using, for example, a hash function. Alice and Bob agree upon a publicly chosen hash function $f$ and take K=$f$(n bits) as the shared r-bit length key K. The hash function randomly redistributes the n bits such that a small change in bits produces a large change in the hash value. Thus, even if Eve determines a number of bits of the transmitted key through eavesdropping, and also knows the hash functions she still will be left with very little knowledge regarding the content of the hashed r-bit key K. Alice and Bob may further authenticate the public channel transmissions to prevent a "man-in-the-middle" attack in which Eve masquerades as either Bob or Alice.

SUMMARY OF THE INVENTION

Systems and methods consistent with the present invention implement path length control in a quantum cryptographic system to mitigate the effects of thermal and stress fluctuations in the transmitter or receiver that may adversely affect the transmission of QKD symbols across a phase-encoded QKD link. In a process equivalent to the above polarization-encoding method, the key bits in the present invention may be encoded in the phase of a photon. A transmitter (Alice) may send single photons by means of a highly attenuated laser, with each photon passing through a phase adjusting element, such as, for example, a Mach-Zehnder interferometer, that may be randomly modulated to one of four phases using a phase adjuster to encode both a value and a basis in the photon's phase $\Phi_{Va}+\Phi_{Ba}$. Since Alice's interferometer may be unbalanced, two time-spaced wavepackets emerge at Alice's output when the interferometer is pulsed. The receiver (Bob) may contain another Mach-Zehnder interferometer, randomly modulated to one of two basis phases $\Phi_{Bb}$ in order to encode a basis.

Ideally, the differential delay in both Bob's and Alice's interferometer is identical to within a few wavelengths and stable to within a fraction of the QKD photon's wavelength. When the two pulses from Alice enter Bob's interferometer, they are split into two sets of two that combine at the output such that the leading pulse of one set overlaps the trailing pulse of the other set. Interference in the overlapping wave functions creates a central pulse whose probability of striking either detector is dependent on the relative phases of the two waves, set by the total phase shift introduced at Alice and Bob, $\Phi_0=\Phi_{Va}+\Phi_{Ba}-\Phi_{Bb}$. When the total phase shift is $\Phi_0=0$, for example, the intensity is maximum at a first receiving photodetector D0 at Bob and minimum at a second receiving photodetector D1 at Bob. A single photon is more likely to strike detector D0, representing a received value of zero. When the total phase shift is $\Phi_0=\pi$, the reverse is true: the photon is more likely to strike D1, which represents a received value of one.

For the link to operate properly the differential delay caused by the short and long arms of each interferometer should be the same and remain stable to within a fraction of the QKD wavelength. This state is difficult to maintain over long periods of time, since the interferometers may be separated by considerable distance and, thus, subject to different environmental conditions. Environmentally-induced changes in differential delay contribute to the applied phase shift, $\Phi_0$, and result in a higher quantum bit error rate (QBER) and disruption of the operation of the quantum link. The total phase shift is therefore $\Phi=\Phi_0+\Delta\Phi$, where $\Delta\Phi$ is an extraneous phase shift.

Systems and methods consistent with the present invention employ a feedback system, that uses training symbols as an input, for continuously and automatically controlling the path length through a QKD link in order to match the interferometer at the transmitter (Alice) precisely with the interferometer at the receiver (Bob) in the presence of site-specific thermal and acoustic fiber-length fluctuations. Systems and methods consistent with the invention, thus, reduce QBER and ensure the proper operation of the QKD link.

In accordance with the purpose of the invention as embodied and broadly described herein, a method of controlling path length in a quantum cryptographic key distribution (QKD) system includes receiving training symbols transmitted from a QKD transmitter over a QKD path. The method further includes controlling a length of the QKD path based on the received training symbols.

In another implementation consistent with the present invention, a method of automatically controlling a path length in a quantum cryptographic key distribution system is provided, where the path includes a first interferometer and a second interferometer. The method includes employing a phase shifting element in the second interferometer. The method further includes automatically adjusting the phase shifting element to control the path length based on symbols transmitted over the path.

In a further implementation consistent with the present invention, a method of automatically controlling a path length in a quantum cryptographic key distribution (QKD) system is provided. The method includes employing a feedback system in the QKD system. The method further includes automatically controlling the path length, using the feedback system, based on symbols transmitted over the path.

In yet another implementation consistent with the present invention, a method of controlling a path length in a quantum cryptographic key distribution (QKD) system is provided. The method includes determining probabilities associated with multiple detection events, the plurality of detection events being associated with a sequence of symbols received over a path in the QKD system. The method further includes controlling a length of the path based on the determined probabilities.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

FIG. 13 is a diagram of an exemplary training event binned count table consistent with the present invention;

FIG. 14 is a diagram of an exemplary joint probability table consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention employ a feedback system, that uses training symbols as an input, for continuously and automatically controlling the path length through a QKD link. Control of the path through the QKD link permits the differential delay path-length of the interferometer at the transmitter (Alice) to be matched with the differential delay path-length of the interferometer at the receiver (Bob) in the presence of site-specific environmental differences. By controlling the path length, systems and methods consistent with the invention reduce QBER and ensure the proper operation of the link.

Exemplary Network

Figure 1:
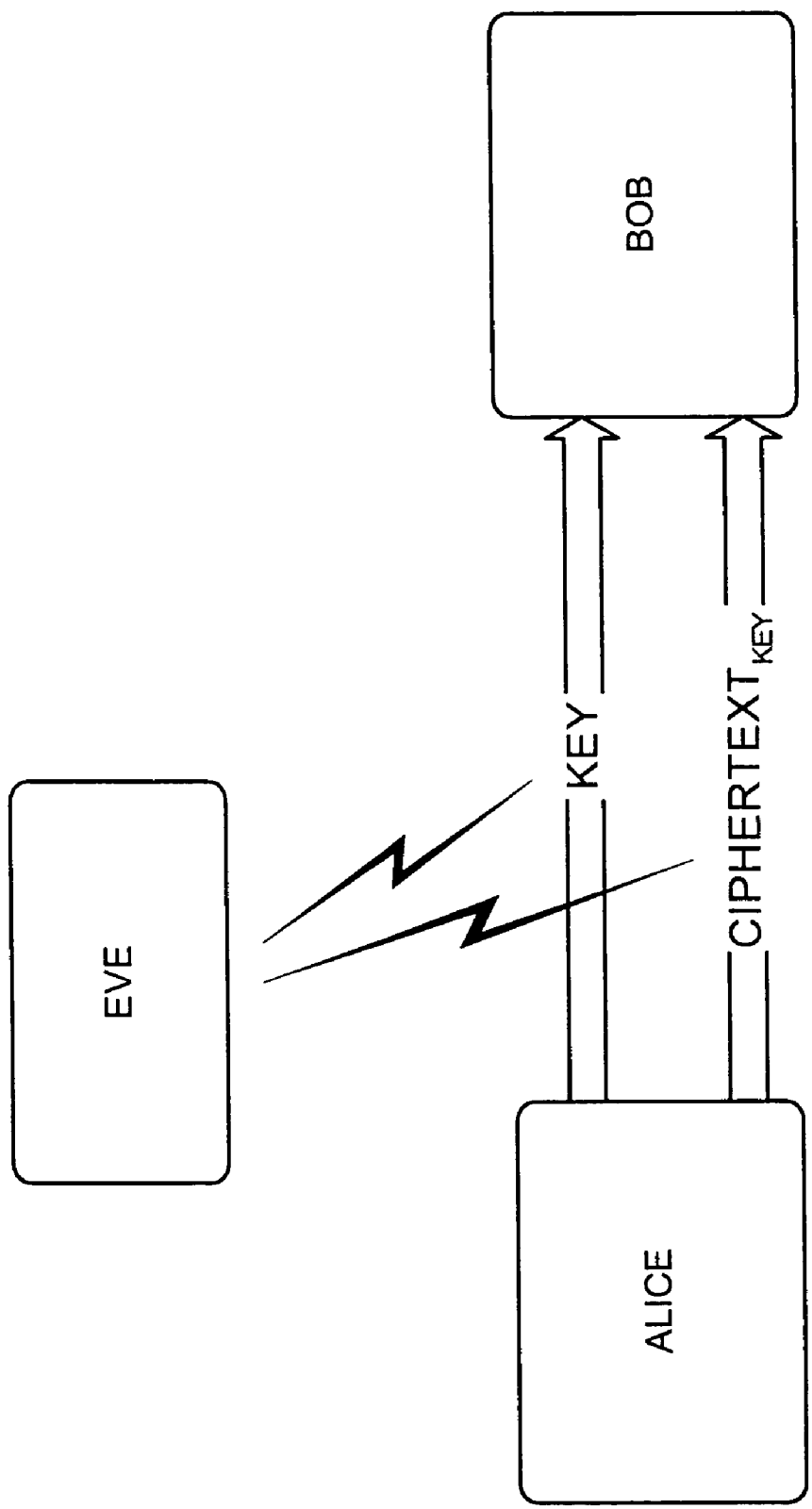
FIG. 1 illustrates conventional cryptographic key distribution and ciphertext communication.
Figure 2:
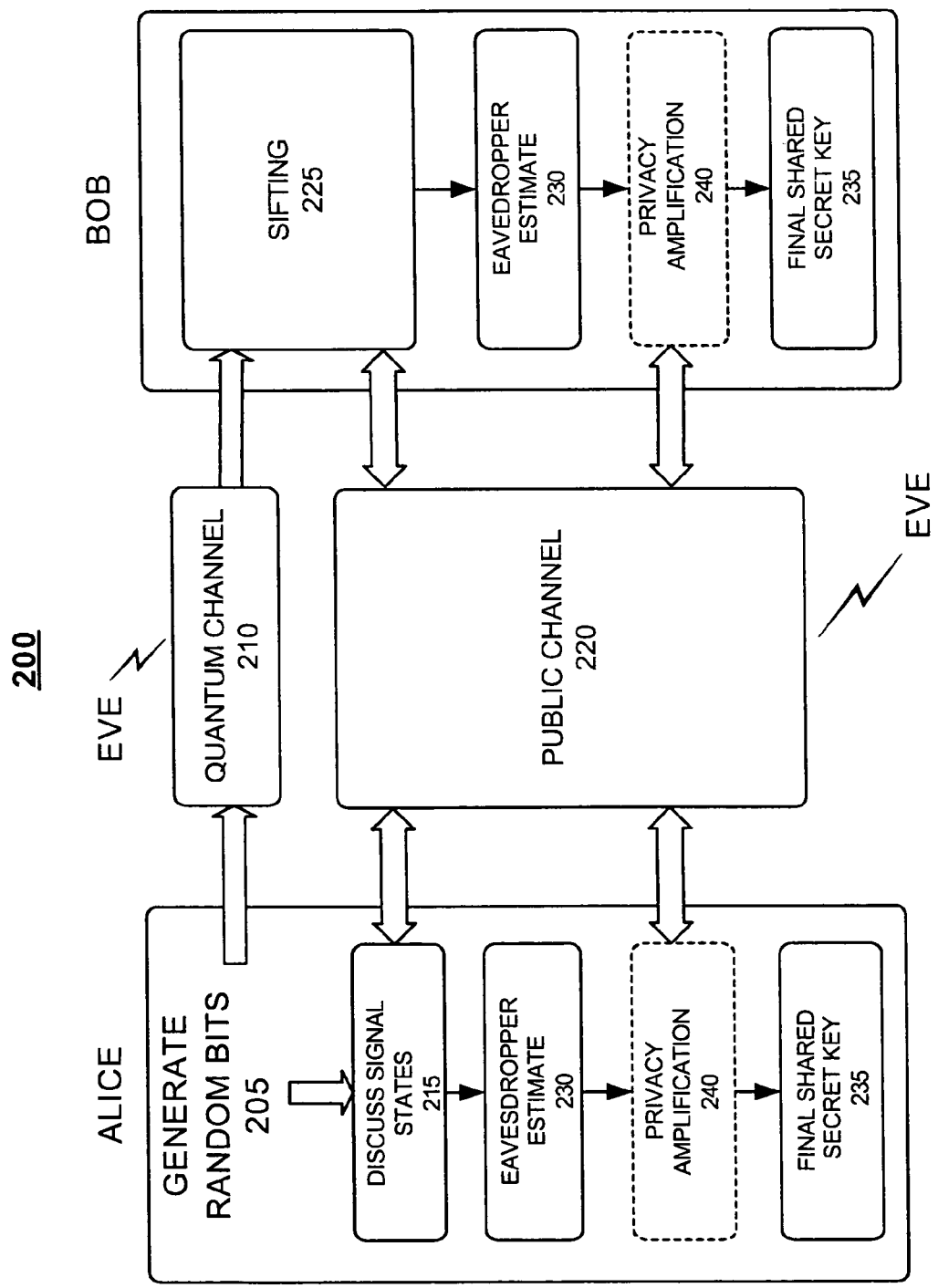
FIG. 2 illustrates a conventional quantum cryptographic key distribution (QKD) process.
Figure 3:
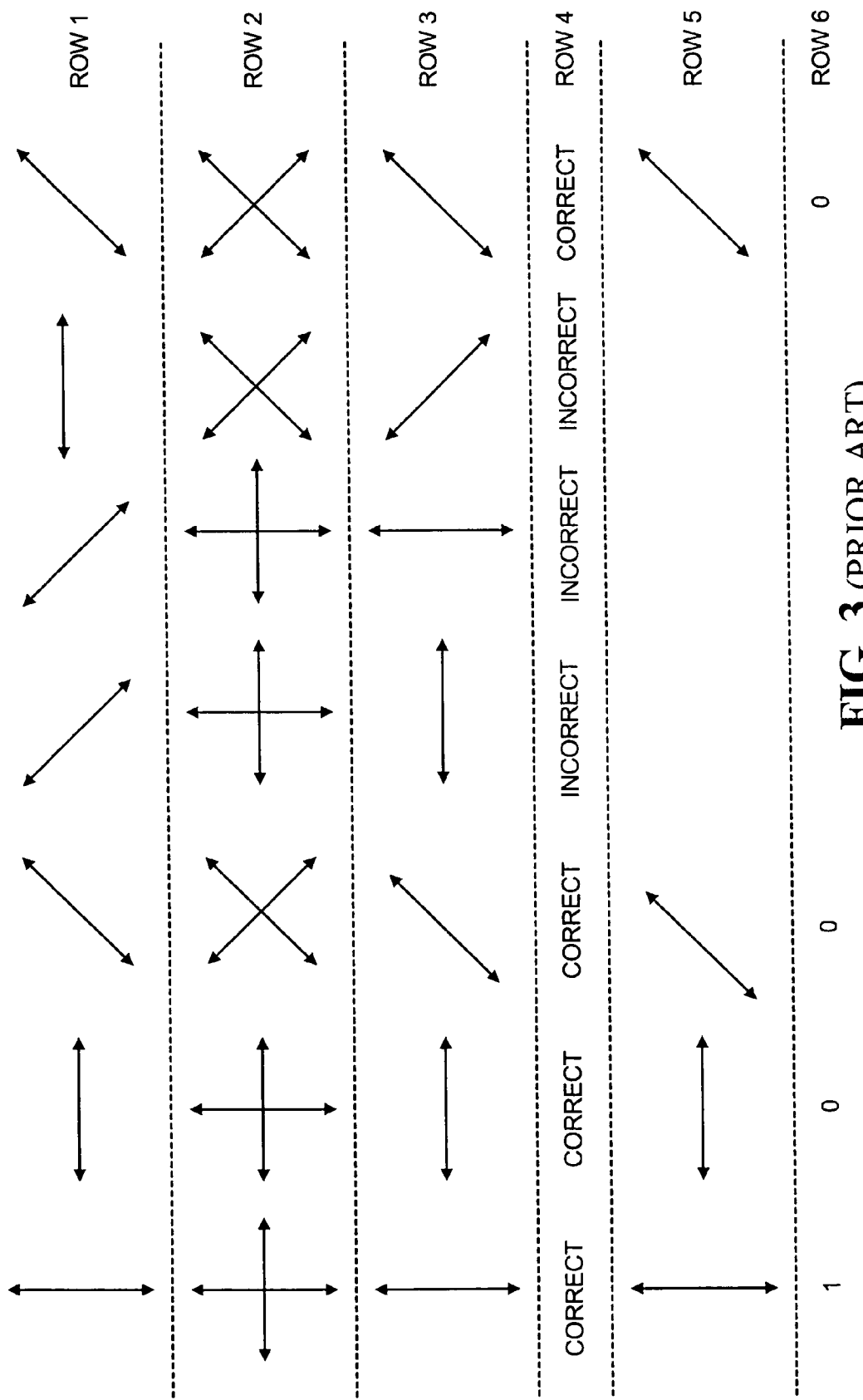
FIG. 3 illustrates conventional quantum cryptographic sifting and error correction.
Figure 4:
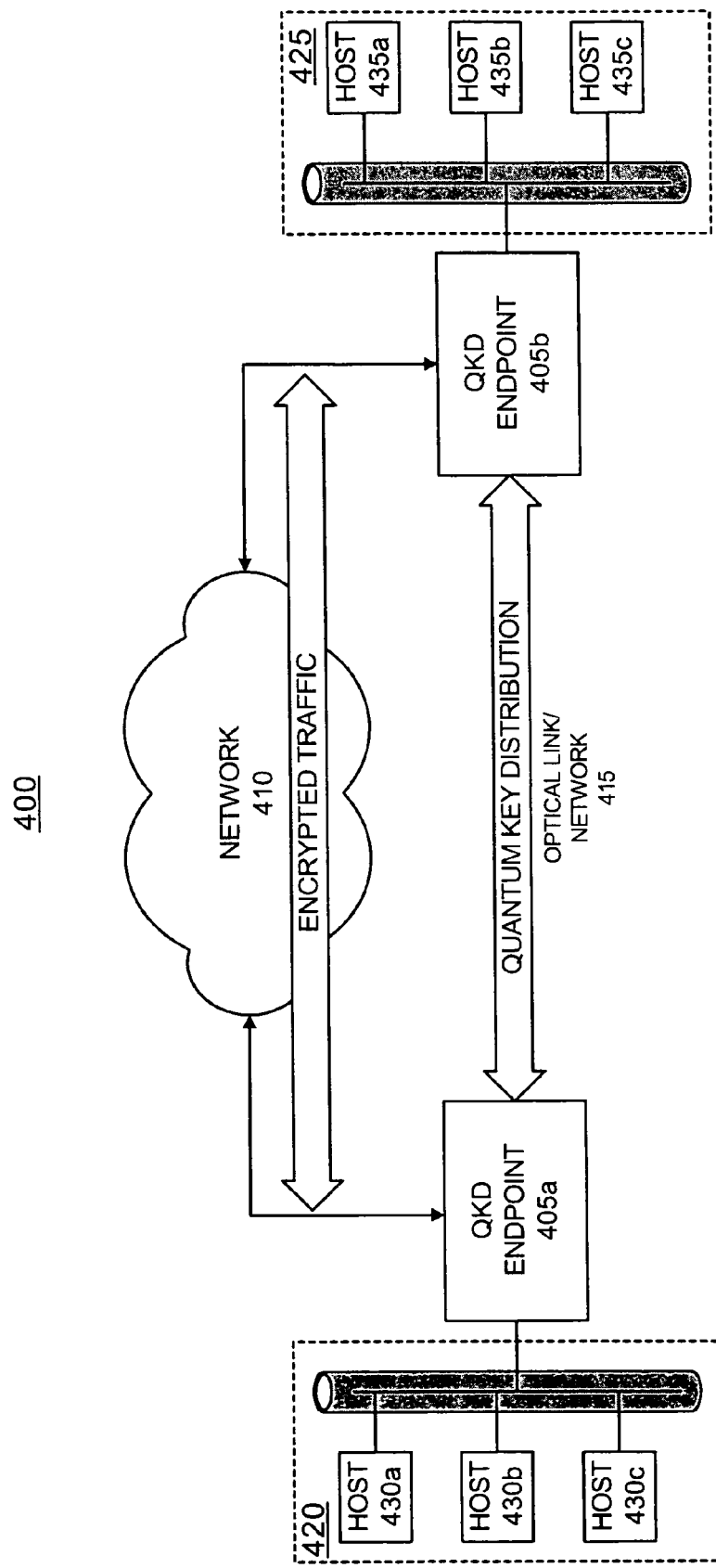
FIG. 4 illustrates an exemplary network in which systems and methods, consistent with the present invention, may be implemented.

FIG. 4 illustrates an exemplary network 400 in which systems and methods, consistent with the present invention, that distribute encryption keys via quantum cryptographic mechanisms can be implemented. Network 400 may include QKD endpoints 405a and 405b connected via a network 410 and an optical link/network 415. QKD endpoints 405a and 405b may each include a host or a server. QKD endpoints 405a and 405b may further connect to local area networks (LANs) 420 or 425. LANs 420 and 425 may further connect with hosts 430a-430c and 435a-435c, respectively. Network 410 can include one or more networks of any type, including a Public Land Mobile Network (PLMN), Public Switched Telephone Network (PSTN), LAN, metropolitan area network (MAN), wide area network (WAN), Internet, or Intranet. Network 410 may also include a dedicated fiber link or a dedicated freespace optical or radio link. The one or more PLMNs may further include packet-switched sub-networks, such as, for example, General Packet Radio Service (GPRS), Cellular Digital Packet Data (CDPD), and Mobile IP sub-networks.

Optical link/network 415 may include a link that may carry light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, a path through the atmosphere or outer space, or even through water or other transparent media. As another alternative, the link may include a hollow optical fiber that may be lined with photonic band-gap material.

Furthermore, optical link/network 415 may include a QKD network that includes one or more QKD switches (not shown) for distributing encryption keys between a source QKD endpoint (e.g., QKD endpoint 405a) and a destination QKD endpoint (e.g., QKD endpoint 405b). Such a QKD network may include the QKD network described in U.S. patent application Ser. No. 09/943,709, entitled "Systems and Methods for Path Set-up in a Quantum Key Distribution Network," and U.S. patent application Ser. No. 09/944,328, entitled "Quantum Cryptographic Key Distribution Networks with Untrusted Switches."

QKD endpoints 405 may distribute Quantum Cryptographic keys via optical link/network 415. Subsequent to quantum key distribution via optical link/network 415, QKD endpoint 405a and QKD endpoint 405b may encrypt traffic using the distributed key(s) and transmit the traffic via network 410.

It will be appreciated that the number of components illustrated in FIG. 4 is provided for explanatory purposes only. A typical network may include more or fewer components that are illustrated in FIG. 4.

Exemplary QKD Endpoint

Figure 5:
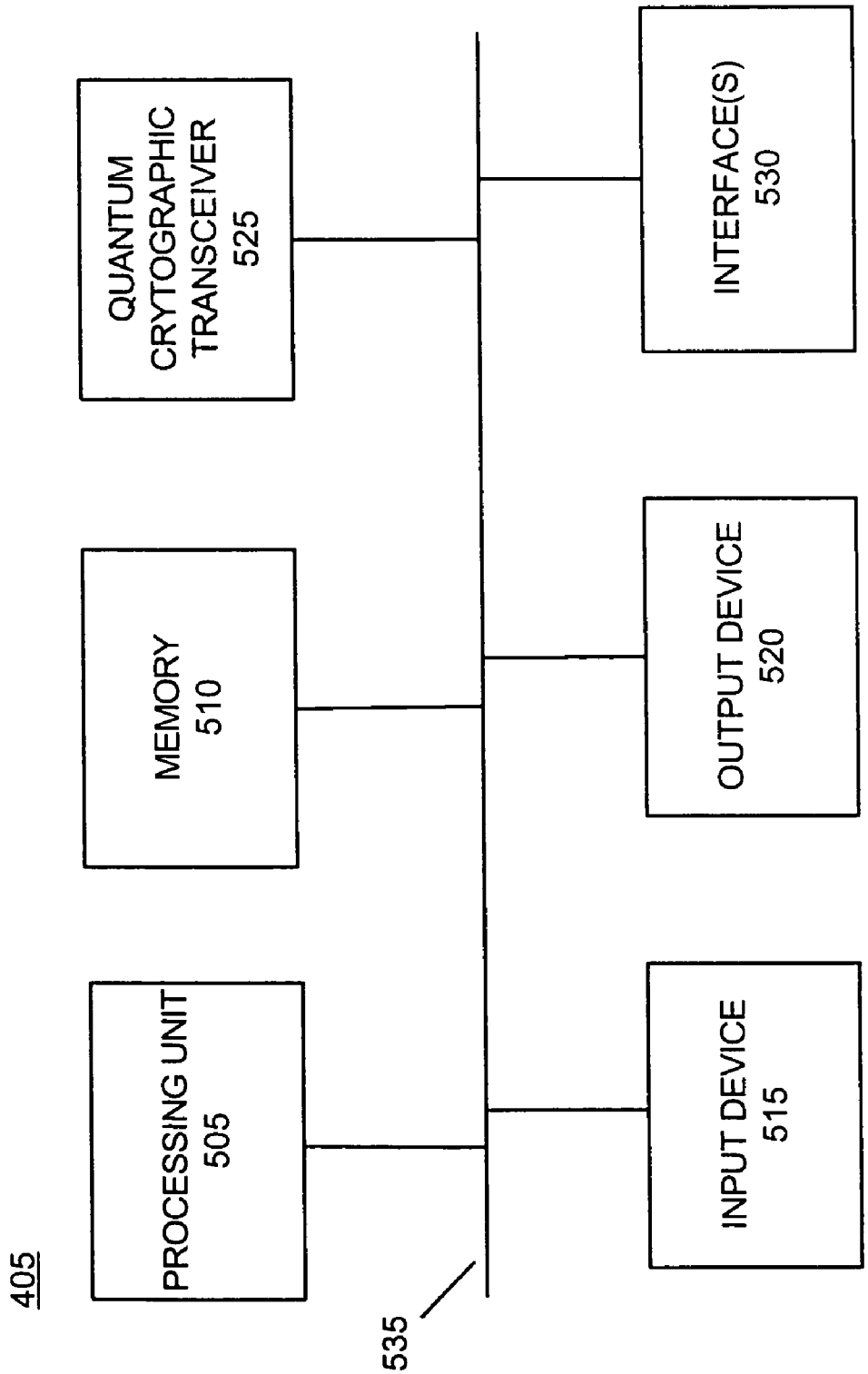
FIG. 5 illustrates an exemplary configuration of a QKD endpoint of FIG. 4 consistent with the present invention.

FIG. 5 illustrates exemplary components of a QKD endpoint 405 consistent with the present invention. QKD endpoint 405 may include a processing unit 505, a memory 510, an input device 515, an output device 520, a quantum cryptographic transceiver 525, an interface(s) 530 and a bus 535. Processing unit 505 may perform all data processing functions for inputting, outputting, and processing of QKD endpoint data. Memory 510 may include Random Access Memory (RAM) that provides temporary working storage of data and instructions for use by processing unit 505 in performing processing functions. Memory 510 may additionally include Read Only Memory (ROM) that provides permanent or semi-permanent storage of data and instructions for use by processing unit 505. Memory 510 can also include large-capacity storage devices, such as a magnetic and/or optical recording medium and its corresponding drive.

Input device 515 permits entry of data into QKD endpoint 405 and may include a user interface (not shown). Output device 520 permits the output of data in video, audio, and/or hard copy format. Quantum cryptographic transceiver 525 may include mechanisms for transmitting and receiving encryption keys using quantum cryptographic techniques. Interface(s) 530 may interconnect QKD endpoint 405 with link/network 415. Bus 535 interconnects the various components of QKD endpoint 405 to permit the components to communicate with one another.

Exemplary Quantum Cryptographic Transceiver

Figure 6:
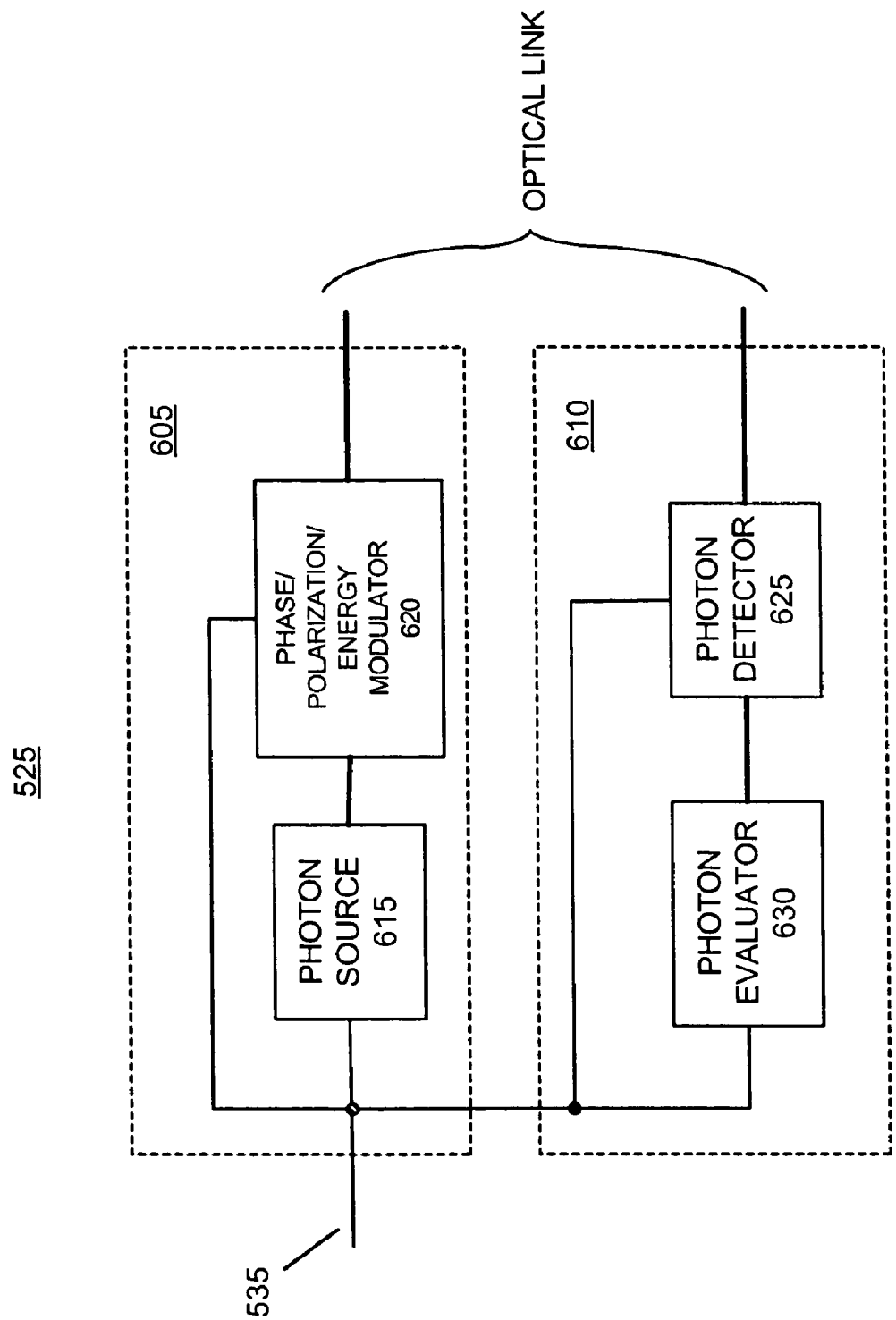
FIG. 6 illustrates exemplary components of the quantum cryptographic transceiver of FIG. 5 consistent with the present invention.

FIG. 6 illustrates exemplary components of quantum cryptographic transceiver 525 of QKD endpoint 405 consistent with the present invention. Quantum cryptographic transceiver 525 may include a QKD transmitter 605 and a QKD receiver 610. QKD transmitter 605 may include a photon source 615 and a phase/polarization/energy modulator 620. Photon source 615 can include, for example, a conventional laser. Photon source 615 may produce photons according to instructions provided by processing unit 505. Photon source 615 may produce photons of light with wavelengths throughout the electromagnetic spectrum, including light in the human visible spectrum and light beyond the human-visible spectrum, such as, for example, infrared or ultraviolet light. Phase/polarization/energy modulator 620 can include, for example, conventional Mach-Zehnder interferometers. Phase/polarization/energy modulator 620 may encode outgoing photons from the photon source according to commands received from processing unit 505 for transmission across an optical link, such as link 415.

QKD receiver 610 may include a photon detector 625 and a photon evaluator 630. Photon detector 625 can include, for example, conventional avalanche photo detectors (APDs) or conventional photo-multiplier tubes (PMTs). Photon detector 625 can also include cryogenically cooled detectors that sense energy via changes in detector temperature or electrical resistivity as photons strike the detector apparatus. Photon detector 625 can detect photons received across the optical link. Photon evaluator 630 can include conventional circuitry for processing and evaluating output signals from photon detector 625 in accordance with quantum cryptographic techniques.

Exemplary QKD Transmitter

Figure 7:
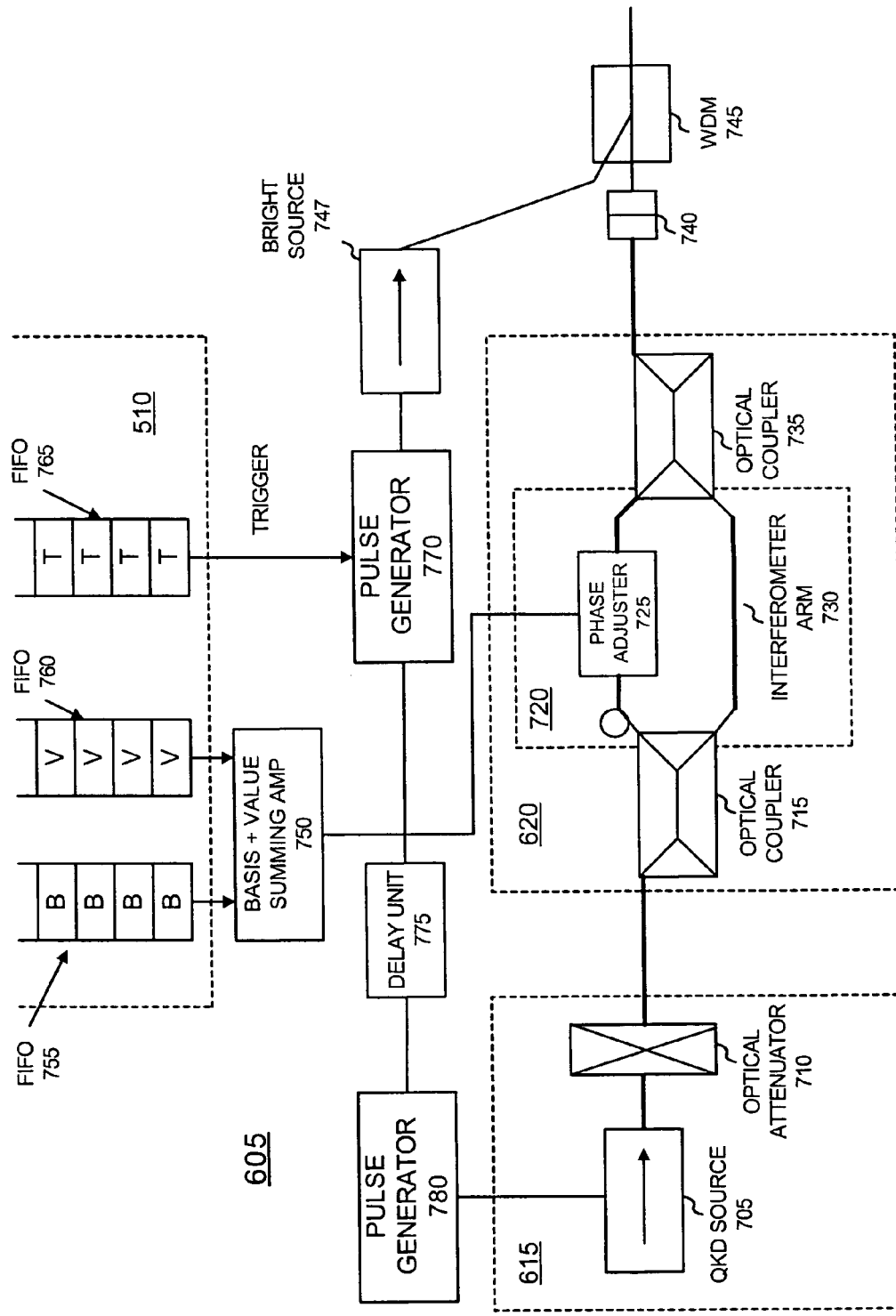
FIG. 7 illustrates exemplary components of the QKD transmitter of FIG. 6 consistent with the present invention.

FIG. 7 illustrates exemplary components of QKD transmitter 605 consistent with the present invention. Photon source 615 of QKD transmitter 605 may include a QKD source 705 and an optical attenuator 710. Phase modulator 620 of QKD transmitter 605 may include an optical coupler 715, an interferometer 720, and an optical coupler 735. QKD transmitter 605 may further include a fiber adapter 740, a wavelength division multiplexer (WDM) 745, a bright source 747, a summing amp 750, a pulse generator 770, a delay unit 775, and a pulse generator 780. As will be described below, QKD transmitter 605 may receive data from a group of first-in-first-out (FIFO) queues 755, 760 and 765 in memory 510.

QKD source 705 may include a laser that produces photon pulses at, for example, a 1550 nm wavelength. The number of photons contained in each photon pulse produced by QKD source 705 may be statistically distributed according to, for example, a Poisson distribution. According to such a statistical distribution, a series of photon pulses emitted by QKD source 705, when attenuated by optical attenuator 710, may include less than a threshold level of photons per pulse on average (e.g., less than 1 photon/pulse). Optical coupler 715 may include, for example, a 50/50 coupler, and may couple dim photon pulses from QKD source 705 to interferometer 720. Interferometer 720 may include a phase adjuster 725 and a separate interferometer arm 730. Interferometer 720 may, for example, include a Mach-Zehnder interferometer, that may be modulated to one of four phases to encode both a basis value and a cryptographic key symbol value in each photon's self interference. For example, a cryptographic key symbol of "0" or "1" may be encoded in either of two randomly selected non-orthogonal bases. In one implementation, the "0" key symbol can be encoded by either a phase shift of 0 (basis 0) or $\pi/2$ (basis 1) and the "1" key symbol can be encoded by either a $\pi$ phase shift (basis 0) or a $3\pi/2$ phase shift (basis 1). Four different basis and key symbol pairs (basis, symbol) may, thus, be encoded by four different phase shifts (0, $\pi/2$, $\pi$, or $3\pi/2$). This may be achieved by applying four different voltages to phase adjuster 725. These voltages may be applied by summing amp 750 which may convert a basis value B received from FIFO 755 and a cryptographic key value V received from FIFO 760 to one of four different voltages for inducing a corresponding phase shift in phase adjuster 725.

Optical coupler 735 may include, for example, a 50/50 coupler, and may couple the signals from phase adjuster 725 and interferometer arm 730 to fiber adapter 740. Fiber adapter 740 may interconnect polarization maintaining fiber from optical coupler 735 to non-polarization maintaining fiber coupled to WDM 745. WDM 745 may multiplex the "dim" photon pulses from QKD source 705 with the "bright" photon pulses generated by bright source 747. Bright source 747 may include a laser that produces multi-photon pulses (e.g., "bright" pulses) at, for example, a 1300 nm wavelength.

A series of trigger values T may be received from FIFO 765 for triggering pulse generator 770. When triggered, pulse generator 770 may send a pulse to bright source 747 for initiating the transmission of a bright pulse, and a pulse to delay unit 775. Delay unit 775 may delay the pulse from pulse generator 770 a specified delay interval before passing the pulse on to pulse generator 780. Upon receipt of the delayed pulse, pulse generator 780 may send an electrical pulse to QKD source 705 for initiating the transmission of a photon pulse that may be attenuated by optical attenuator 710 to produce a dim photon pulse.

Exemplary QKD Receiver

Figure 8:
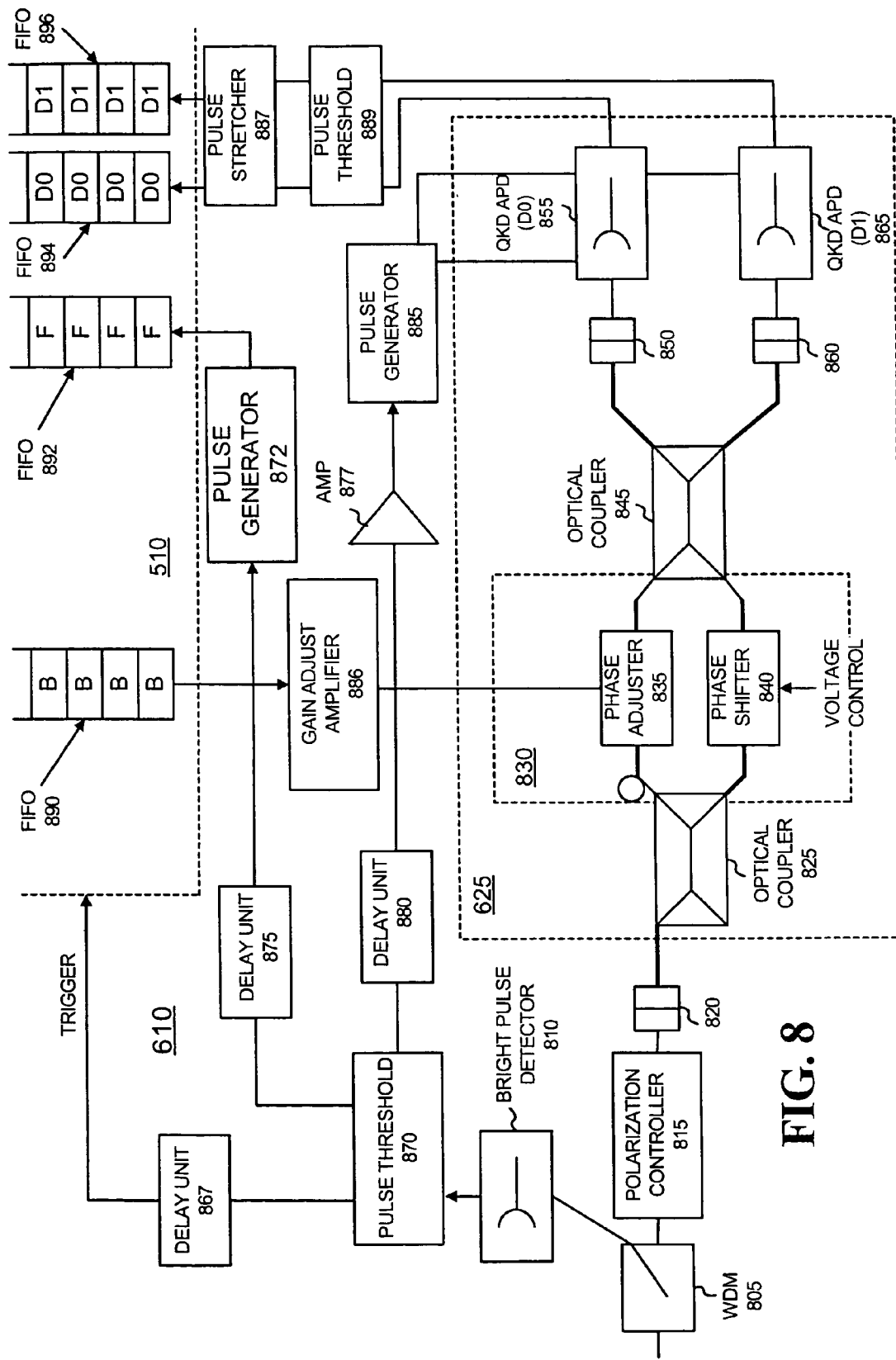
FIG. 8 illustrates exemplary components of the QKD receiver of FIG. 6 consistent with the present invention.

FIG. 8 illustrates exemplary components of a QKD receiver 610 consistent with the present invention. QKD receiver 610 may include a WDM 805, a bright pulse detector 810, a polarization controller 815, a fiber adapter 820, an optical coupler 825, an interferometer 830, an optical coupler 845, a fiber adapter 850, a QKD APD 855 (labeled detector "D0"), a fiber adapter 860, and a QKD APD 865 (labeled detector "D1"). QKD receiver 610 may further include a pulse threshold device 870, delay units 867 and 875, a pulse generator 872, a delay unit 880, an amplifier 877, a pulse generator 885, a gain adjust amplifier 886, a pulse threshold device 889, and a pulse stretcher 887. Memory 510 may include multiple FIFO's 890, 892, 894 and 896.

WDM 805 may demultiplex optical pulses transmitted from a QKD transmitter 605 of another QKD endpoint 405. WDM 805 may, for example, demultiplex bright pulses received at 1300 nm wavelength to bright pulse detector 810. WDM 805 may further, for example, demultiplex dim pulses received at 1550 nm wavelength to polarization controller 815. Polarization controller 815 may adjust the polarization of incoming dim pulse photons, which have had their polarization altered by transit across link 415, such that the photons exhibit uniform polarization. Fiber adapter 820 may adapt non-polarization maintaining fiber coupled to polarization controller 815 to polarization maintaining fiber coupled to optical coupler 825. Optical coupler 825 may provide dim pulses to interferometer 830. Interferometer 830 may include, for example, a Mach-Zehnder interferometer and may further include a phase adjuster 835 and a phase shifter 840. A phase shift may be randomly applied to phase adjuster 835 via gain adjust amplifier 886. Gain adjust amplifier 886 may receive a basis value B from FIFO 890 indicating either a $0-\pi$ or a $\pi/2-3\pi/2$ phase angle. Gain adjust amplifier 886 may translate the basis value to an output voltage that adjusts the phase shift of phase adjuster 835 an amount corresponding to the output voltage. Phase shifter 840 may maintain a stable path length during photon transmission and reception and may maintain the identity of interferometers at QKD transmitter 605 and QKD receiver 610. In some implementations, for example, phase shifter 840 may include a conventional fiber stretcher that is controlled by a voltage source (not shown) for adjusting the path length. In other implementations, phase shifter 840 may only include a conventional phase modulator controlled by a voltage source. Yet in other implementations, a bias voltage may be applied directly to the phase adjuster 835.

Optical coupler 845 may couple the signals from phase adjuster 835 and phase shifter 840 and provide the coupled signals to QKD APD 855 via fiber adapter 850, and to QKD APD 865 via fiber adapter 860. Fiber adapter 850 may adapt polarization maintaining fiber coupled to a port of optical coupler 845 to non-polarizarion maintaining fiber coupled to QKD APD 855. Fiber adapter 860 may adapt non-polarization maintaining fiber coupled to a port of optical coupler 845 to non-polarization maintaining fiber coupled to QKD APD 865.

Bright pulse detector 810 may pass an electrical annunciator pulse, indicating receipt of a bright photon pulse, to pulse threshold device 870. Pulse threshold device 870 may provide a logic pulse for each bright pulse received at detector 810 to trigger the gating of QKD APDs (D0) 855 and (D1) 865 via delay unit 880, amplifier 877 and pulse generator 885. Delay unit 880 may delay the logic pulse trigger from pulse threshold device 870 a sufficient interval such that QKD APDs (D0) 855 and (D1) 865 are gated precisely at a time a subsequent dim photon pulse arrives. At the receipt of a dim photon pulse at either QKD APD (D0) 855 or (D1) 865, the outputs of the APDs are sampled by pulse threshold device 889. Pulse threshold device 889 provides a pulse corresponding to each APD 855 and 865 if their sampled outputs meet a specified threshold value. Pulse stretcher 887 receives the corresponding pulse(s) from pulse threshold device 889 and converts the received pulses to a logic high symbol (i.e., a pulse is received) or a logic low symbol (i.e., no pulse is received). Logic high or low symbols corresponding to the output from QKD APD (D0) 855 may be provided to FIFO 894. Logic high or low symbols corresponding to the output from QKD APD (D1) 865 may be provided to FIFO 896.

Pulse threshold device 870 may further provide a logic pulse, corresponding to each received bright photon pulse, as a trigger to FIFOs 890, 892, 894 and 896 via delay unit 867. The trigger may "clock" data in or out of each of the FIFOs.

Pulse threshold device 870 may further provide a logic pulse, via delay unit 875, to trigger pulse generator 872. Pulse generator 872, responsive to a trigger pulse from pulse threshold device 870, may pass a framing symbol F to FIFO 892.

Exemplary Qframe/Photon Pulse Mapping

Figure 9:
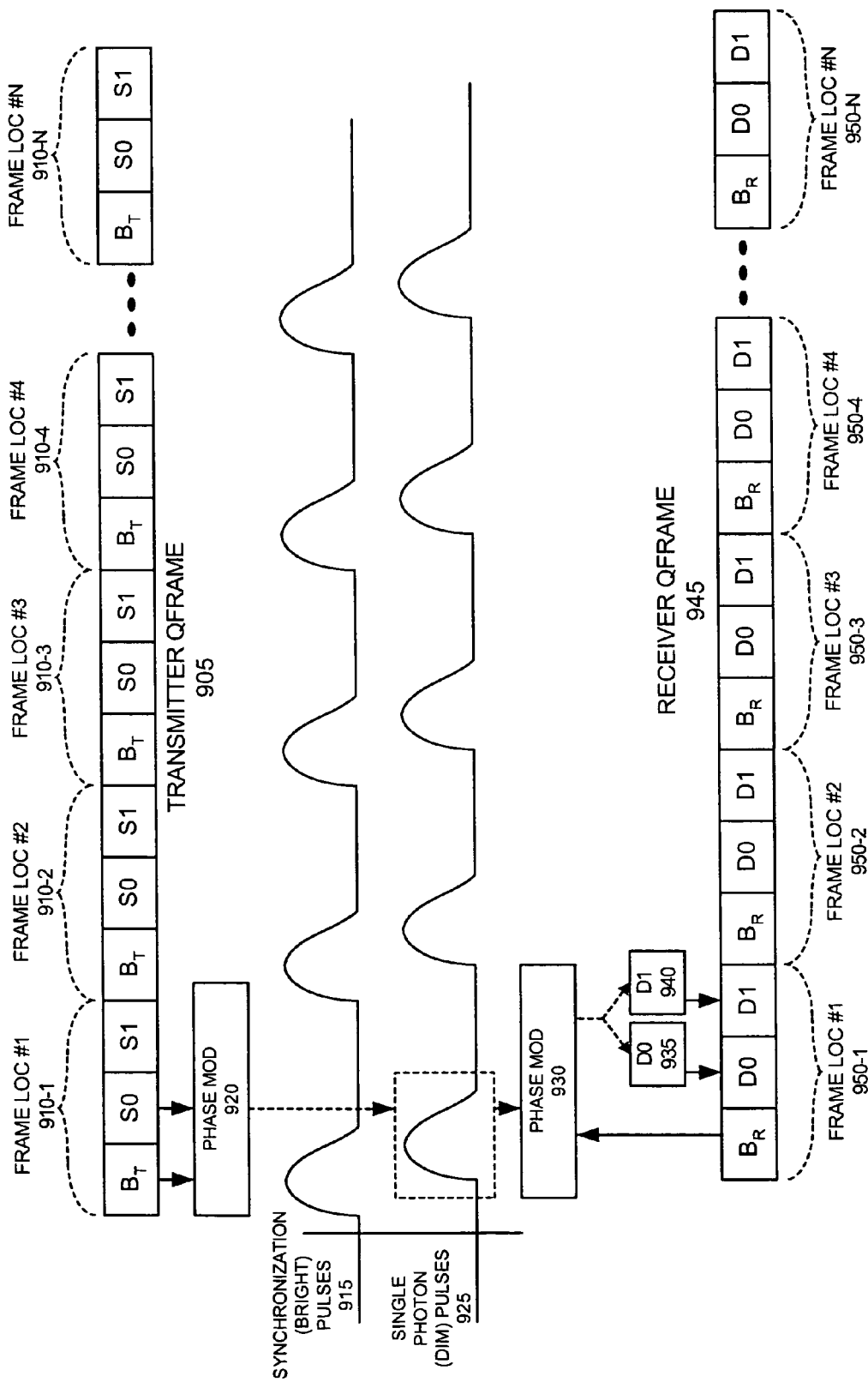
FIG. 9 is a diagram illustrating exemplary relationships between bright and dim pulses and framing at the QKD transmitter and receiver.

FIG. 9 illustrates an exemplary mapping between a first Qframe 905 constructed at QKD transmitter 605, and a second Qframe 945 constructed at QKD receiver 610, and "bright" and "dim" pulses transmitted by QKD transmitter 605. Bright pulses 915 may indicate synchronization timing and frame boundaries (as described in more detail below with respect to FIG. 11). Dim pulses 925 may contain quantum cryptographic key symbols encoded via modulation of, for example, the phase of the dim photon pulse transmitted from QKD transmitter 605.

A transmitter Qframe 905 may include multiple frame locations (frame loc #1 910-1 through frame loc #N 910-N), each of which may include a number of symbol values. A frame length may determine the number of frame locations in transmitter Qframe 905. The frame length may be fixed, or may vary with each frame. The symbols of each frame location may include a basis symbol $B_T$, a first symbol S0 and a second symbol S1. Basis value $B_T$ may indicate one of two bases. A first basis may include a phase shift of 0 or $\pi$. A second basis may include a phase shift of $\pi/2$ or $3\pi/2$. Symbols S0 and S1 may, together, indicate a quantum cryptographic key symbol. For example, S0 and S1 symbols of "01" may indicate a key symbol of "0." As an additional example, S0 and S1 symbols of "10" may indicate a key symbol of "1." Basis symbol $B_T$ and each symbol S0 and S1 may be used to phase modulate 920 an outgoing "dim" pulse 925 from QKD transmitter 605.

A receiver Qframe 945 may include multiple frame locations (frame loc #1 950-1 through frame loc #N 950-N), each of which may include a number of symbol values. A frame length may determine the number of frame locations in receiver Qframe 945. The frame length may be fixed, or may vary with each frame. The symbols of each frame location may include a basis symbol $B_R$, a first detected symbol D0 935 and a second detected symbol D1 940. Basis value $B_R$ may indicate one of two bases. A first basis may include a phase shift of 0 or $\pi$. A second basis may include a phase shift of $\pi/2$ or $3\pi/2$. Basis value $B_R$ may be used to phase modulate 930 a received dim pulse 925. D0 935 may indicate a symbol detected at QKD APD (D0) 855 of QKD receiver 610. D1 940 may indicate a symbol detected at QKD APD (D1) 865 of QKD receiver 610.

Exemplary Bright Pulse Symbol Encoding

Figure 10A:
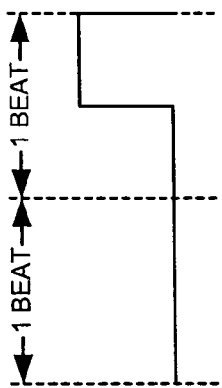
FIGS. 10A-10C are diagrams that illustrate exemplary symbols used to encode QKD framing information consistent with the present invention.
Figure 10B:
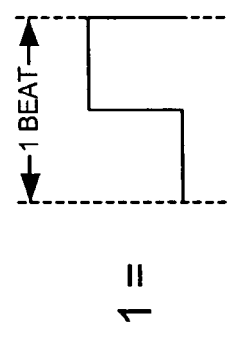
Figure 10C:
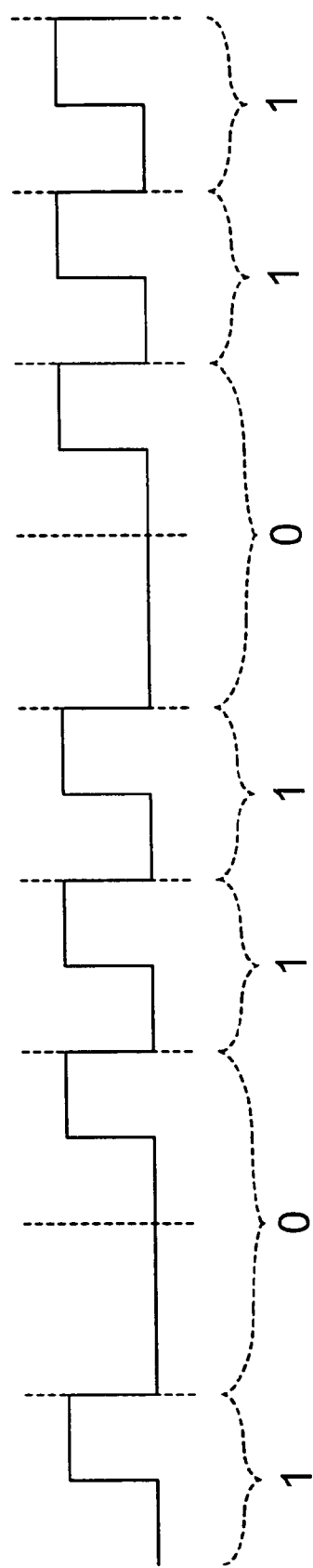

FIGS. 10A-10C illustrate exemplary bright photon pulse symbol encoding consistent with the present invention. As shown in FIG. 10A, a "1" symbol can be encoded by a rising edge of a bright photon pulse that is produced within a pre-determined "beat" interval. As further shown in FIG. 10B, a "0" symbol can be encoded by a rising edge of a bright photon pulse that is delayed by at least one beat interval. Though FIG. 10B illustrates a rising edge delayed by one beat, the rising edge of the "0" symbol may be delayed an indeterminate period of time, as long as the delay is at least equal to or greater than one beat. For example, a period of a microsecond or more, followed by a rising edge, may indicate a "0" symbol, where a rising edge within a period of time less than that may indicate a "1" symbol. FIG. 10C illustrates an exemplary symbol series "1011011" encoded according to the bright pulse encoding scheme illustrated in FIGS. 10A and 10B.

Exemplary Bright Pulse Frame Structure

Figure 11:
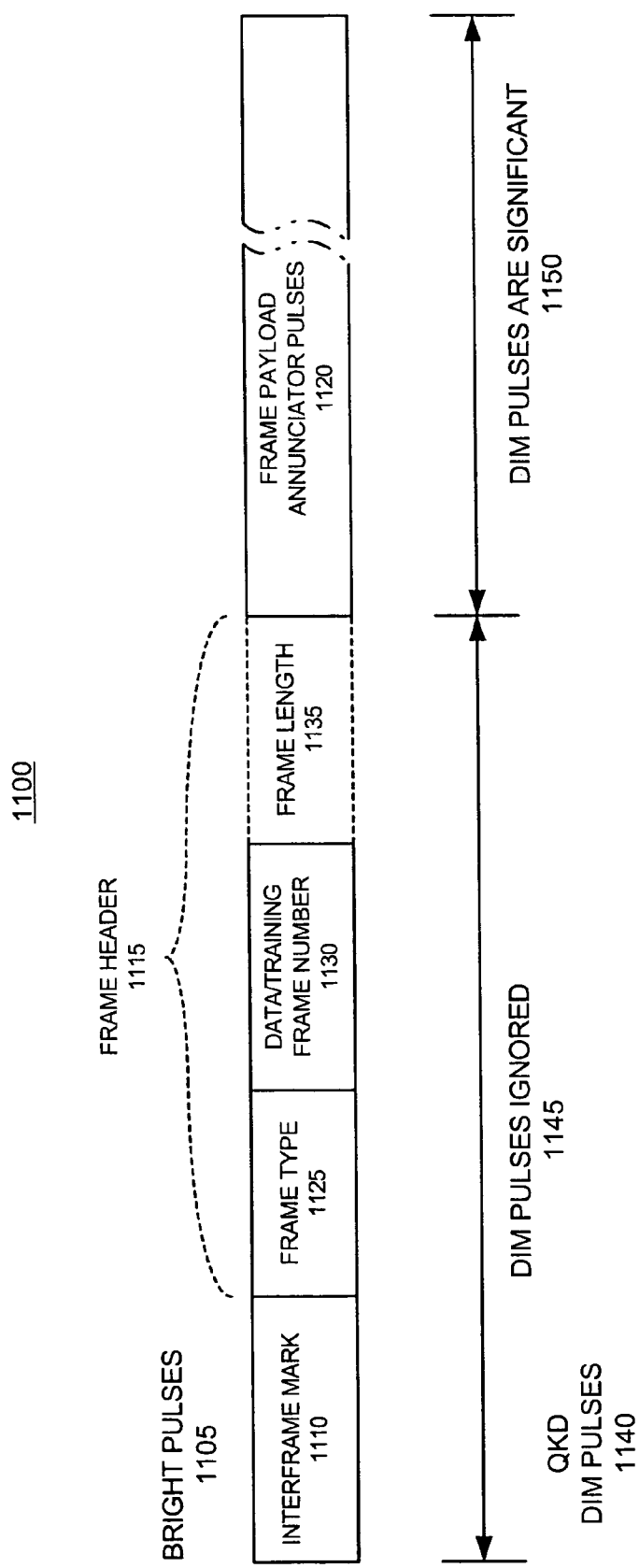
FIG. 11 is a diagram illustrating an exemplary frame structure consistent with the present invention.

FIG. 11 illustrates an exemplary bright pulse frame 1100 consistent with the present invention. Multiple "bright pulses" 1105 transmitted by bright source 747 of QKD source 605 may define frame 1100. Frame 1100 may include an interframe mark 1110, a frame header 1115, and frame payload annunciator pulses 1120. Interframe mark 1110 may include a specially designated sequence of bright pulses that indicates a start of a new frame. For example, a symbol sequence 00000000001 may indicate a start of a new frame. As an alternative example, a symbol sequence 1111111110 may indicate the start of a new frame. Frame header 1115 may include a number of fields, such as, for example, a frame type 1125, a data/training frame sequence number 1130 and an optional frame length 1135. Frame type 1125 may indicate whether frame 1100 includes a data frame or a training frame (though other types of frames may also be used). Data/training frame sequence number 1130 may include a number of bits that indicate a sequence number of frame 1100. For example, frame number 1130 may include 32 bits binary encoded with frame 1100's frame number. Data frame and training frames may have independent (i.e., drawn from different numbering spaces) or dependent sequence numbers (i.e., drawn from identical, or related, numbering spaces). Thus, training frames may have frame numbers that are sequenced independently of the frame numbers for data frames. Data/training frame number 1130 may be encoded by a variety of techniques. Such encoding techniques may include, for example, binary encoding, Bose-Chaudhuri-Hochquenghem encoding or any type of error detecting and correcting encoding that is resistant to noisy or lossy channels. Optional frame length 1135 may include a number of bits that indicate a frame length of frame 1100. Frame length 1135 may include, for example, 32 bits binary encoded with a length of frame 1100.

Frame payload annunciator pulses 1120 may include a number of pulses that identify the boundaries of the payload of frame 1100. In a fixed length frame (i.e., frame with no frame length 1135), frame payload annunciator pulses 1120 may include, for example, 1024 bits all set to "1." In a variable length frame, for example, frame payload annunciator pulses 1120 may include a number of bits set to "1" as determined by frame length 1135.

During the bright pulses of the frame payload annunciator pulses 1120, the "dim" pulses 1140 transmitted by QKD transmitter 605 can be considered to be "significant," and, thus, include the symbols of the frame payload (see 1150, FIG. 11). During the period of the frame spanning the inter-frame mark 1110, frame type 1125, frame number 1130 and frame length 1135, any "dim" pulses transmitted by QKD transmitter 605 can be considered insignificant and, thus, ignored (see 1145, FIG. 11). In the case of training frames, the "significant" symbols of the frame payload may include a pre-determined, repetitive sequence of symbols, or may include a sequence of symbols generated by an algorithm (e.g., a pseudorandom generator), the results of which may be keyed off the frame's frame number 1130.

Exemplary Data and Training Frame Sequence

Figure 12:
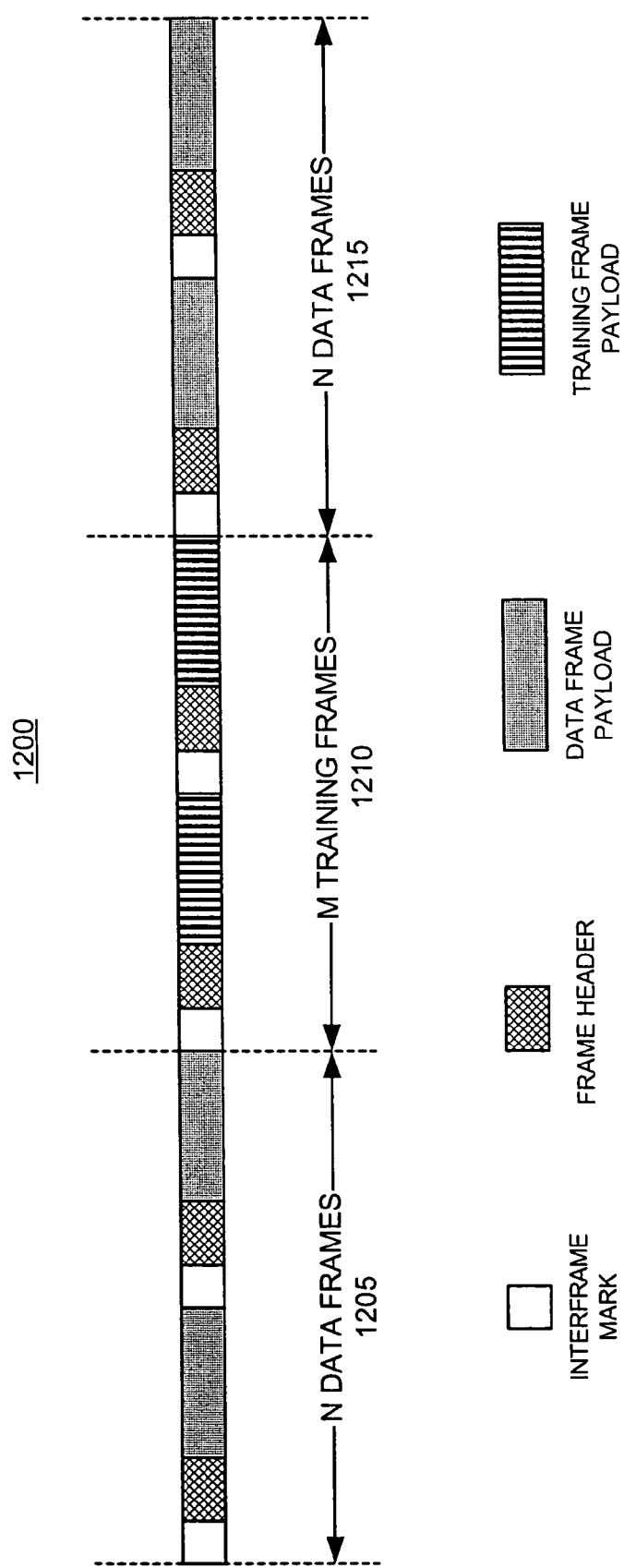
FIG. 12 is a diagram illustrating an exemplary sequence of data frames and training frames consistent with the present invention.

FIG. 12 is a diagram of an exemplary sequence 1200 of transmitted data frames and training frames consistent with the invention. As shown, sequence 1200 may include N transmitted data frames 1205, followed by M transmitted training frames 1210, followed in turn by another N transmitted data frames 1215, and so on. Sequence 1200 is shown for illustrative purposes only. Sequence 1200 may include any number of training frames interspersed with any number of data frames. For example, sequence 1200 may be repetitive, or may be dynamically modified such that the number of data frames and training frames continuously varies. The mixture of data frames and training frames in sequence 1200 may be pre-determined, or may adapted to best fit the current operation or state of the link between the QKD transmitter and the QKD receiver.

Exemplary Binned Count Table

FIG. 13 is a diagram of an exemplary count table 1300 consistent with the present invention. Count table 1300 may store binned counts of detector "hits" corresponding to the basis and values associated with received "dim" photons and the basis with which the received "dim" photons are measured. In one implementation, count table 1300 may be stored in memory, 510 of a QKD endpoint 405. Alternatively, count table 1300 may also be stored in a database external to a QKD endpoint 405.

Count table 1300 may include a field that indicates basis and value pairs 1305 associated with symbols transmitted from another QKD endpoint 405a (referred to as "Alice"), a field 1310 that indicates a basis used by the receiving QKD endpoint 405b (referred to as "Bob") for measuring received "dim" pulses, a theoretical total phase shift value $\Phi_0$ 1310 for the path between Alice and Bob, and binned counts of training events 1320. The binned counts of training events 1320 may include counts for "no hits" 1325 indicating a binned count of no symbols detected at either APD (D0) 855 or APD (D1) 865 of QKD receiver 610, a "D0 hit" 1330 indicating a binned count of symbols detected only at D0 APD 855, and not D1 APD 865, a "D1 hit" 1335 indicating a binned count of symbols detected only at D1 APD 865, and not D0 APD 855, and "D0, D1 hits" 1340 indicating a binned count of symbols detected at both D0 APD 855 and D1 APD 865.

Exemplary Joint Probability Table

FIG. 14 is a diagram of an exemplary joint probability table 1400 consistent with the present invention. Joint probability table 1400 may include the binned counts of training events 1320 of count table 1300 normalized to the total number of training events contained in count table 1300. The process of receiving a phase-encoded symbol can be considered to include two experiments: setting the phase of the interferometers 720 and 830, and observing the detector D0 855 and D1 865 values. The sample space of these experiments, when considered as a whole, includes eight possible combinations of phase settings (e.g., two sets of 0, $\pi/2$, $\pi$, and $3\pi/2$ for BB84 protocol), and four combinations of detector values (D0=0∩D1=0; D0=1∩D1=0; D0=0∩D1=1; and D0=1∩D1=1). Defining two separate experiments, A and B, experiment A may include disjoint events $A_0$ 1405, $A_1$ 1410, $A_2$ 1415, ..., $A_7$ 1420, with each disjoint event corresponding to the specific total phase shift in both interferometers, $\Phi_0+\Delta\Phi$. Experiment B may include four disjoint events $B_0$ 1425, $B_1$ 1430, $B_2$ 1435 and $B_3$ 1440, with each disjoint event corresponding to a different combination of the detection events (i.e., neither detector D0 855 nor detector D1 865 have fired (0,0), detector D0 855 only has fired (0,1), detector D1 865 only has fired (1,0) and both detectors 855 and 865 have fired (1,1)). Each intersection of a row and column in count table 1300 may be normalized by the total number of events and inserted in a corresponding entry of joint probability table 1400. For example, row 1, column 1 of count table 1300 may be normalized and inserted into joint probability table 1400 as the probability of the intersection of events $A_0$ and event $B_0$ ($P(A_0 \cap B_0)$). As another example, row 8, column 4 of count table 1300 may be normalized and inserted into joint probability table 1400 as the probability of the intersection of events $A_7$ and $B_3$. Furthermore, the sum of the joint probabilities in any column n of joint probability table 1400 results in the marginal probability $P(B_n)$ 1445, which indicates the probability of the occurrence of a particular event from experiment B, irrespective of the results of experiment A. Similarly, the sum of the joint probabilities in any row m of joint probability table 1400 results in the marginal probability $P(A_m)$ 1450, which indicates the probability of the occurrence of a particular event from experiment A, irrespective of the results of experiment B.

In one implementation, joint probability table 1400 may be stored in memory 510 of a QKD endpoint 405. Alternatively, joint probability table 1400 may also be stored in a database external to a QKD endpoint 405.

Exemplary Path Length Diagram

Figure 15:
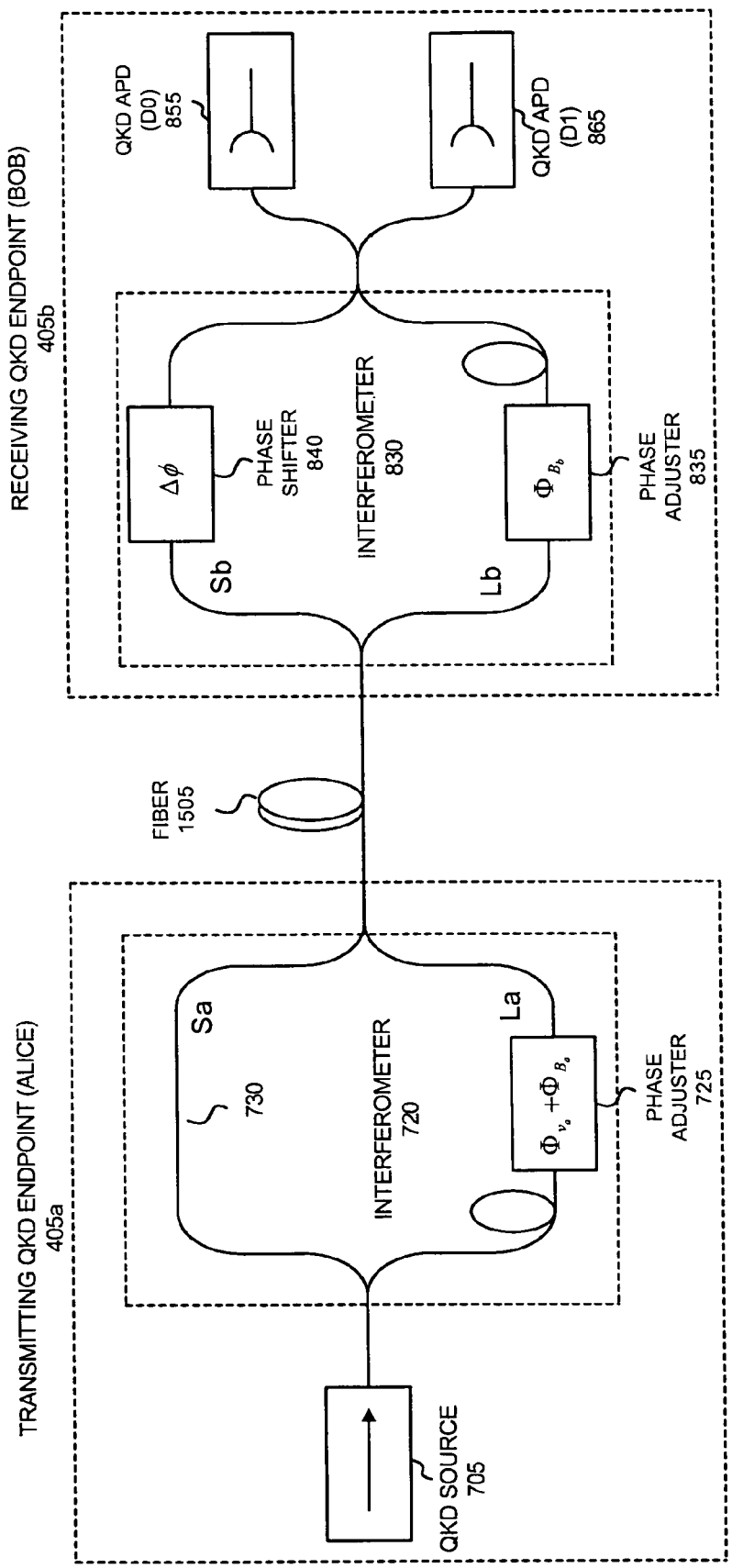
FIG. 15 is an exemplary QKD path length diagram consistent with the present invention.

FIG. 15 illustrates an exemplary path length diagram that shows the path, that includes an optical fiber 1505, a photon pulse may take between a QKD source 705 of a transmitting QKD endpoint 405*a* (i.e., Alice) before being detected by one or both of detectors D0 855 and D1 865 at a receiving QKD endpoint 405*b* (i.e., Bob). In the exemplary phase path length diagram of FIG. 15, the transmitting QKD endpoint's 405*a* phase modulator 620 (not shown) includes a first interferometer 720 and the receiving QKD endpoint's 405*b* photon detector 625 (not shown) includes a second interferometer 830. Interferometer 720 includes a short interferometer arm of length Sa and a long interferometer arm of length La. Interferometer 830 includes a short interferometer arm of length Sb and a long interferometer of length Lb. The mismatch between the arms of the first interferometer 720 may be long enough such that when pulsed with narrow pulses from QKD source 705, two distinct time-spaced wave packets emerge with a differential delay proportional to La–Sa. The differential delay in both interferometers 720 and 830 is identical to within a few wavelengths and stable to within a fraction of the QKD photon's wavelength. When the two wave packets from Alice's interferometer 720 enter Bob's interferometer 830, they are split into two sets of two that combine at the output such that the leading wave packet of one set overlaps the trailing pulse of the other set. Interference in the overlapping wave functions creates a central pulse whose probability of striking either QKD APD detector 855 or 865 is dependent on the relative phases of the two waves, set by the total phase shift introduced at Alice and Bob, $\Phi_0=\Phi_{Va}+\Phi_{Ba}-\Phi_{Bb}$.

Consistent with one exemplary embodiment of the present invention that employs BB84 protocol, an additional phase shift may be introduced in La and Lb, thus, controlling the constructive or destructive interference at detectors D0 855 and D1 865. For example, when the total introduced phase shift $\Phi_0=\Phi_{Va}+\Phi_{Vb}-\Phi_{Bb}$ is zero, the intensity may be maximum at detector D0 855 and minimum at detector D1 865. For the total phase of $\pi$, the reverse is true, and for the total phase shift of $\pi/2$ and $3\pi/2$ the intensity of the resulting central peak may be equal for both of the detectors. For the protocol to operate properly, the differential delay caused by the short and long arms of each interferometer should be the same and remain stable to within a fraction of the QKD wavelength. This state is difficult to maintain over long periods of time, since both interferometers 720 and 830 may be in different locations (i.e., usually separated by ten's of kilometers) and subject to different temperature, pressure and stress conditions. Environmentally-induced changes in differential delay contribute to the applied phase shift, $\Phi_0$, and result in a higher quantum bit error rate (QBER) and disruption of the operation of the quantum link. The total phase shift is therefore $\Phi=\Phi_0+\Delta\Phi$, where $\Delta\Phi$ is an extraneous phase shift.

In order to compensate for the phase error that results from environmentally-induced phase changes in the interferometers, a phase shifter may be included in the short arm of the interferometer 830. A phase error may be determined from statistics associated with the detection events given know settings of the intended photon phases. The phase error may then be compensated dynamically, by adjusting the phase shifter 840 to expand or contract the effective path length such that $\Delta\Phi=0$. In one implementation in which phase shifter 840 includes, for example, a fiber stretcher, the phase error may be compensated by adjusting the voltage of the fiber stretcher, thus, expanding or contracting the fiber length.

In order to directly separate the extraneous phase error from the intended photon phase values in the detection statistics, the phase shift values applied by Alice for each qubit, $\Phi_{Va}+\Phi_{Ba}$ would have to be known. This information is not immediately available to Bob during data transmission, since the bit value and basis phases transmitted by Alice are completely random. Some of this information becomes available after the sifting of qubits, however, the variation in phase error is typically too rapid to allow for information from the delayed qubit sifting to be useful. Thus, consistent with the present invention, training frames, that include deterministic information about the values of $\Phi_{Va}+\Phi_{Ba}$, may be used. Each training frame contains qubits encoded using deterministic value and basis pairs as agreed upon by Alice and Bob prior to frame transmission. While receiving qubits in training frames, Bob continues to apply random bases. However, since the value and basis settings at Alice are known apriori to Bob, Bob can recover the total phase shift $\Phi_0$ for each qubit without public communication with Alice. Since the detection probability distribution function for both detectors depends on $\Phi_0$ and phase error, the value of the phase error may, for example, be estimated by solving a set of non-linear equations.

Exemplary Path Length Control Feedback System

Figure 16:
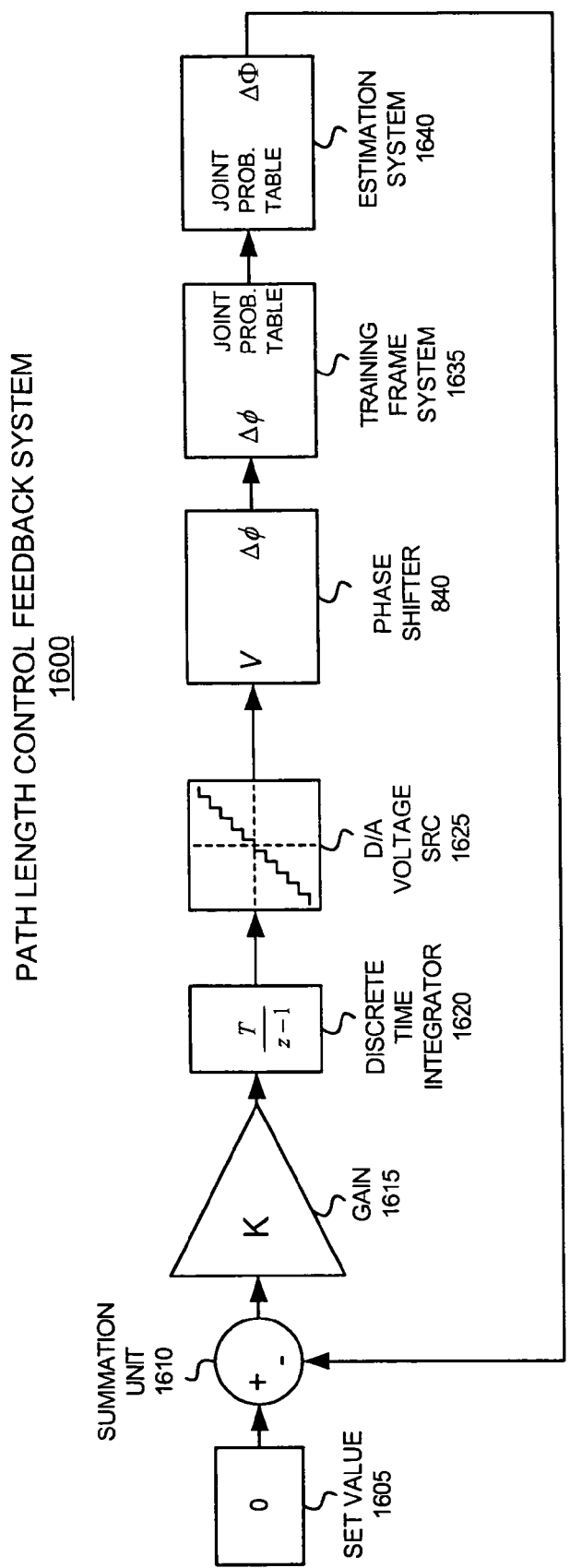
FIG. 16 is a diagram of an exemplary path length control feedback system consistent with the present invention.

FIG. 16 illustrates an exemplary path length control feedback system 1600, consistent with the present invention, for compensating for inaccuracy in the estimates of the phase error $\Delta\Phi$ when controlling the QKD system path length. Feedback system 1600 may include a set value 1605, a summation unit 1610, a gain (K) unit 1615, a discrete time integrator 1620, a digital-to-analog (D/A) voltage source 1625, a phase shifting element 1630, a training frame system 1635, and an estimation system 1640. Set value 1605 may set the nominal value of the induced phase error for adjusting the QKD path length. Summation unit 1610 may sum the set value with the fed back output of the estimation system 1640 and provide the summed value to gain unit 1615. Gain 1615 may include a proportional gain value K for amplifying the output of the summation unit 1610. In one implementation, discrete time integrator 1620 may integrate the output of gain unit 1615 with a sampling time T and provide the output to D/A voltage source 1625. D/A voltage source 1625 may convert the digital output voltage from integrator 1620 to an analog voltage level that can be applied to phase shifter 840. Phase shifter 840 may include, in one implementation, a fiber stretcher that may stretch or contract the system path length according to the voltage applied by voltage source 1625. Training frame system 1635 may model the training frame processing process in which the contents of training frames are counted in counted table 1300, and then normalized as probabilities in joint probability table 1400. Estimation system 1640 may model the process for estimating the total path length phase error $\Delta\Phi$ using the probabilities tabulated in joint probability table 1400 (see FIGS. 25-26 below). In one implementation, for example, estimation system 1640 may employ a conventional least squares estimation technique for estimating the phase error $\Delta\Phi$. The phase error $\Delta\Phi$ estimated by estimation system 1640 may be fed back to summation unit 1610 to, in combination with discrete-time integrator 1620 and gain unit 1615, close the loop and set the steady error of feedback system 1600 to zero.

The stability of feedback system 1600 may depend on the sum of the sample time T and the computational delay, as well as the proportional gain K. The higher the gain, the faster the system 1600 will respond to change in phase error $\Delta\Phi$ (the overshoot would be higher and the rise time would be the smallest). However, as the gain K is increased, the settling time will become longer due to the ringing of the phase error $\Delta\Phi$, up to the point of instability. Choosing the right sampling time T is important as well.

The estimation of $\Delta\Phi$ may be based on joint probability table 1400, and the more counts that are present in the table, the closer the probability of detection events converges to its mean for each point and, thus, the error of the estimate becomes smaller. However, as T becomes significantly large, the value of the phase error $\Delta\Phi$ starts to change during the counts. This can be compensated by: a) increasing the number of training frames, or b) isolating both interferometers better (i.e., setting the time constant for the interferometer setup large). The plant of the system, which consists of the phase shifter, the training frames susbsystem, and the estimator may be essentially a linear system. It is characterized by the proportional gain of the phase shifter and sampling dynamics that arise from the delay required to collect data and compute the estimates.

Exemplary Quantum Cryptographic Frame Transmission Process

FIGS. 17-20 are flowcharts that illustrate an exemplary process, consistent with the present invention, for framing and transmitting cryptographic symbols over a quantum cryptographic link. As one skilled in the art will appreciate, the method exemplified by FIGS. 17-20 can be implemented as a sequence of instructions and stored in memory 510 of QKD endpoint 405 for execution by processing unit 505. Though the exemplary process of FIGS. 17-20 is illustrated as an iterative loop, the process may be stopped, in some implementations, upon transceiver power-down, by way of user control, etc.

Figure 17:
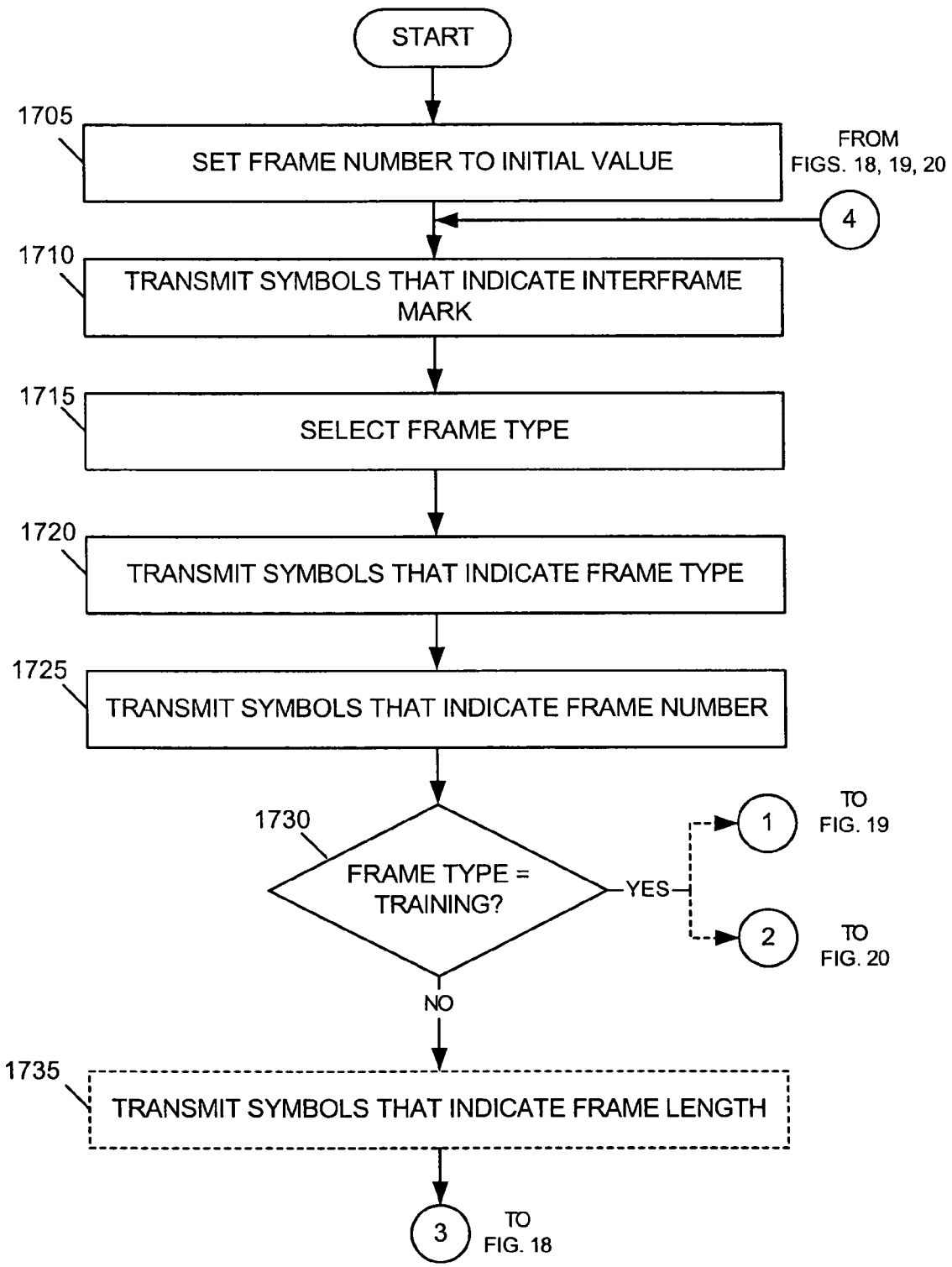
FIGS. 17-20 are flow charts that illustrate an exemplary QKD frame transmission process consistent with the present invention.

The exemplary process may begin with the setting of frame number 1130 to an initial value [act 1705](FIG. 17). In some exemplary embodiments, for example, the frame number 1130 can be set to zero. Bright source 747 of QKD transmitter 605 may then transmit symbols that indicate interframe mark 1110 [act 1710]. For example, bright source 747 may transmit the symbols "0000000001" or some other group of symbols to indicate a start of the frame. A frame type 1125 may then be selected [act 1715]. The selected frame type 1125 may include, for example, a data frame or a training frame. Bright source 747 of QKD transmitter 605 may then transmit symbols that indicate the selected frame type 1125 [act 1720]. Bright source 747 of QKD transmitter 605 may further transmit symbols that indicate frame number 1130 [act 1725]. For example, bright source 747 may transmit 32 symbols that include an encoded frame number. The frame number may be encoded using binary encoding, BCH encoding, or any type of error detecting and correcting encoding.

Figure 18:
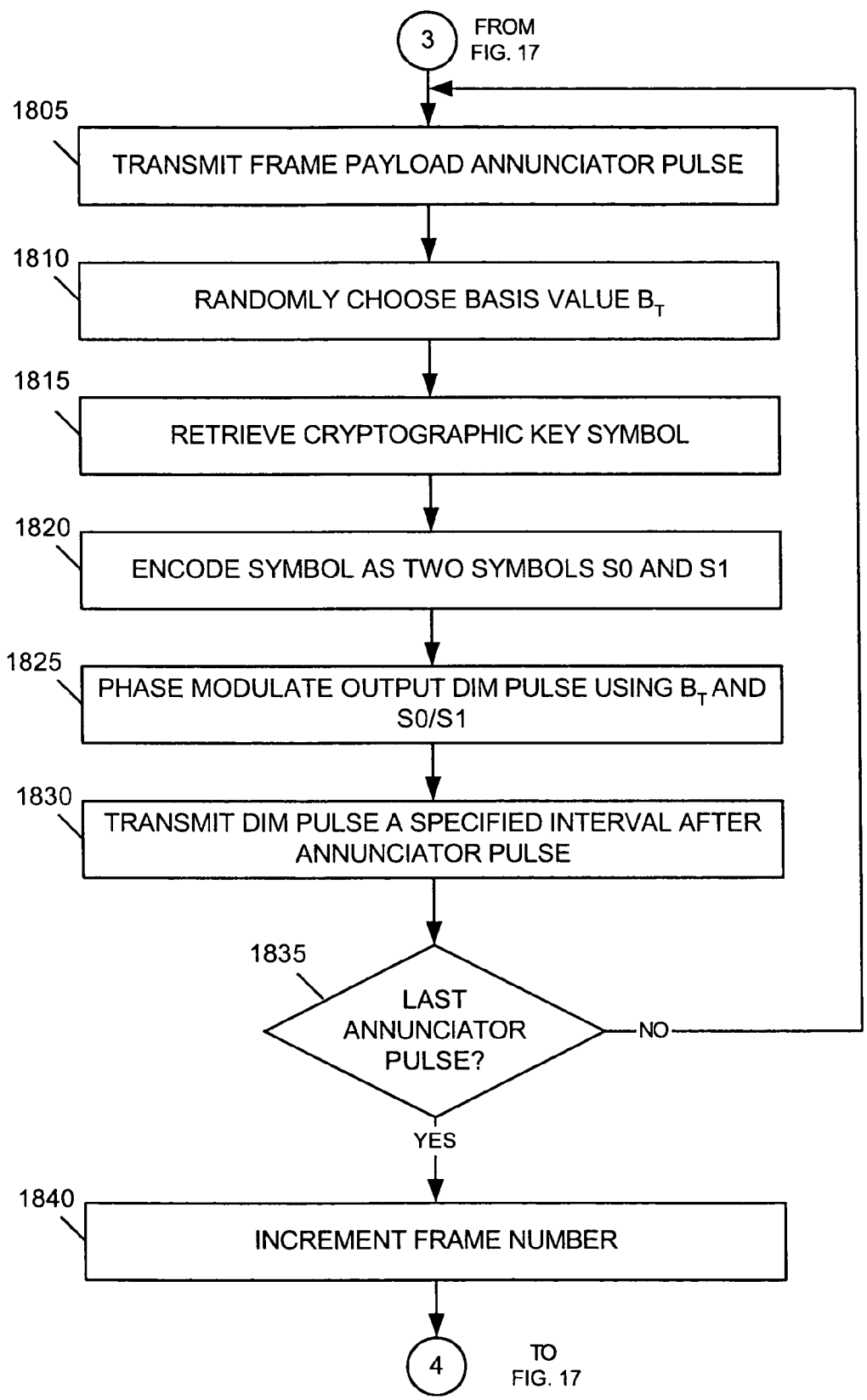
Figure 19:
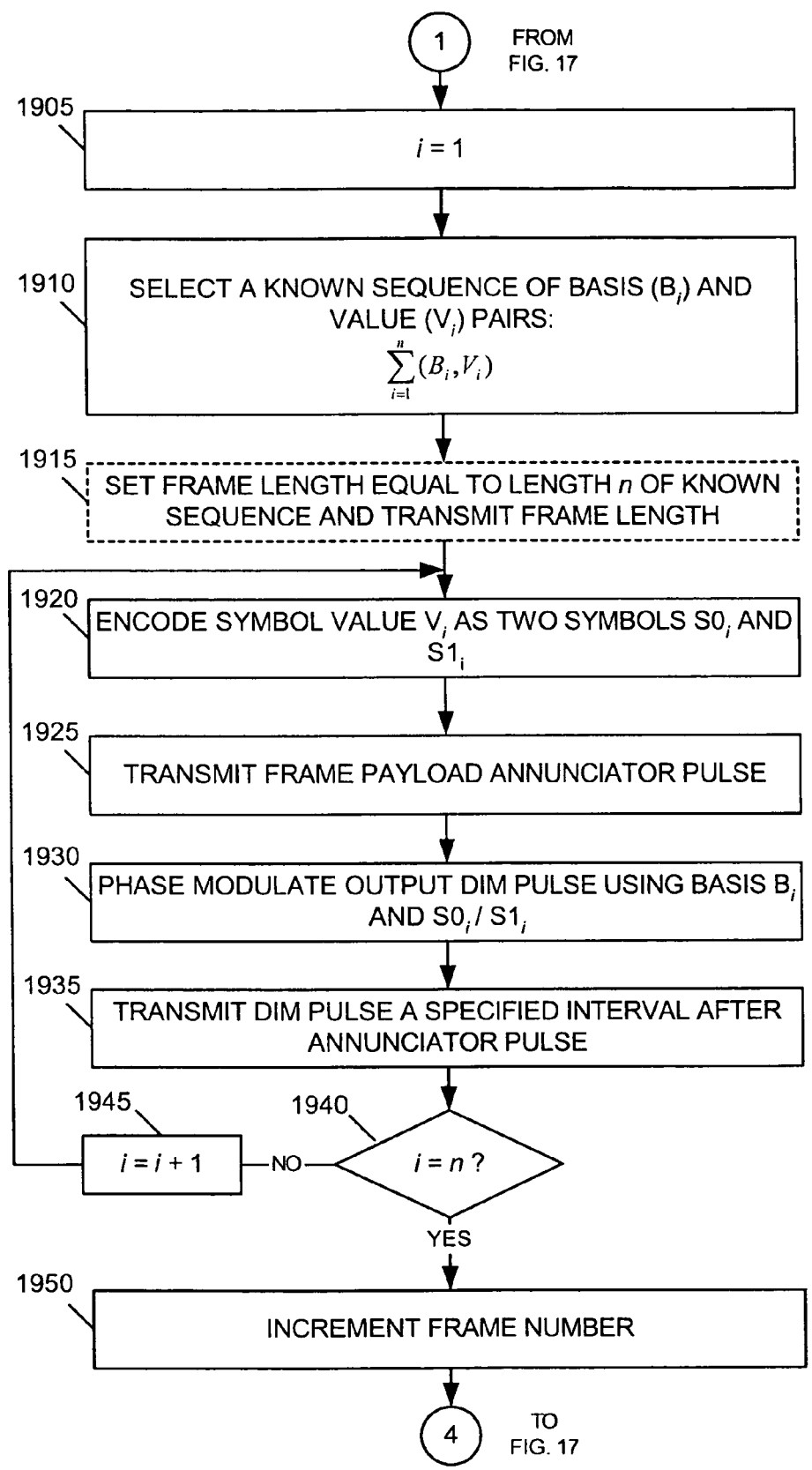
Figure 20:
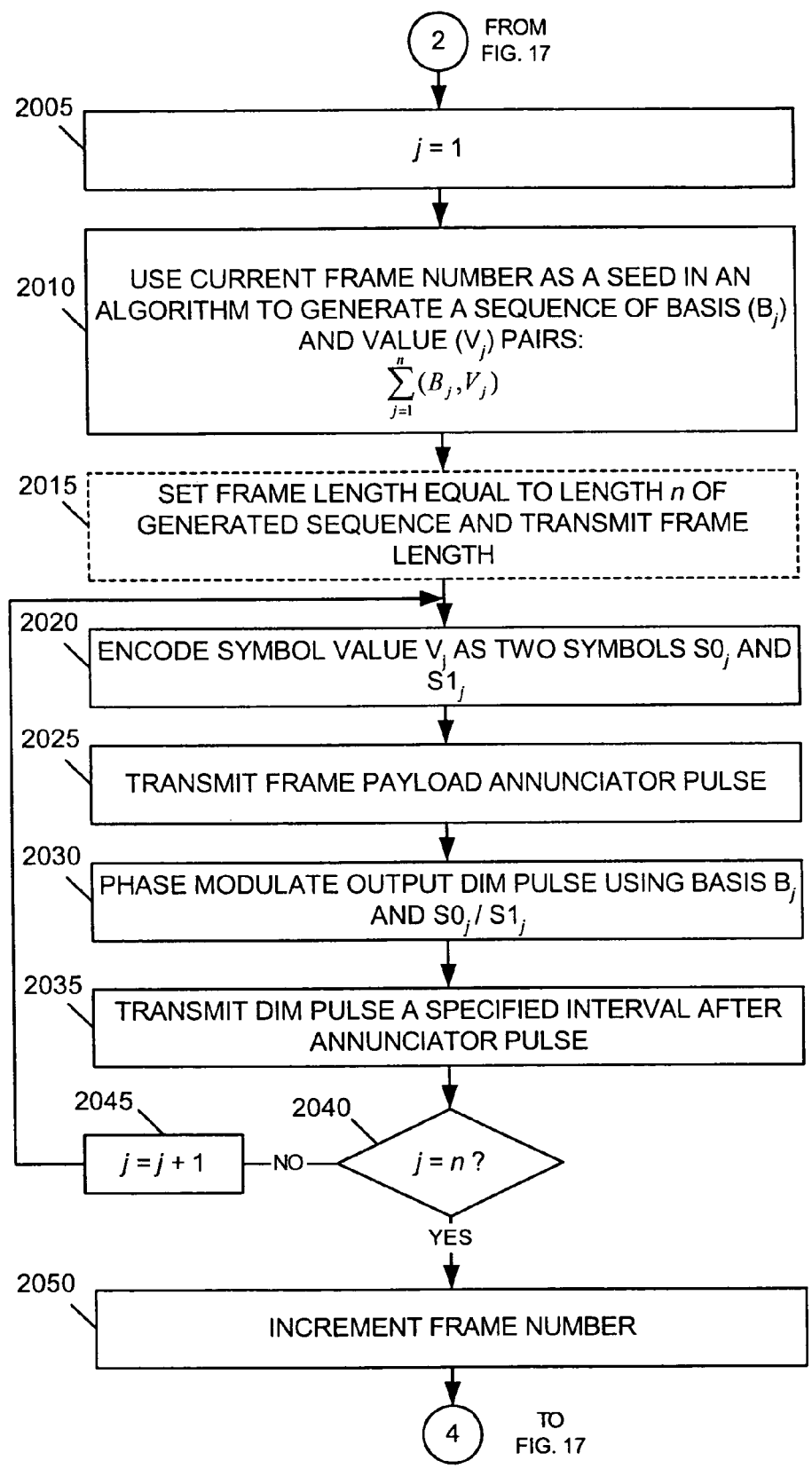
Figure 21:
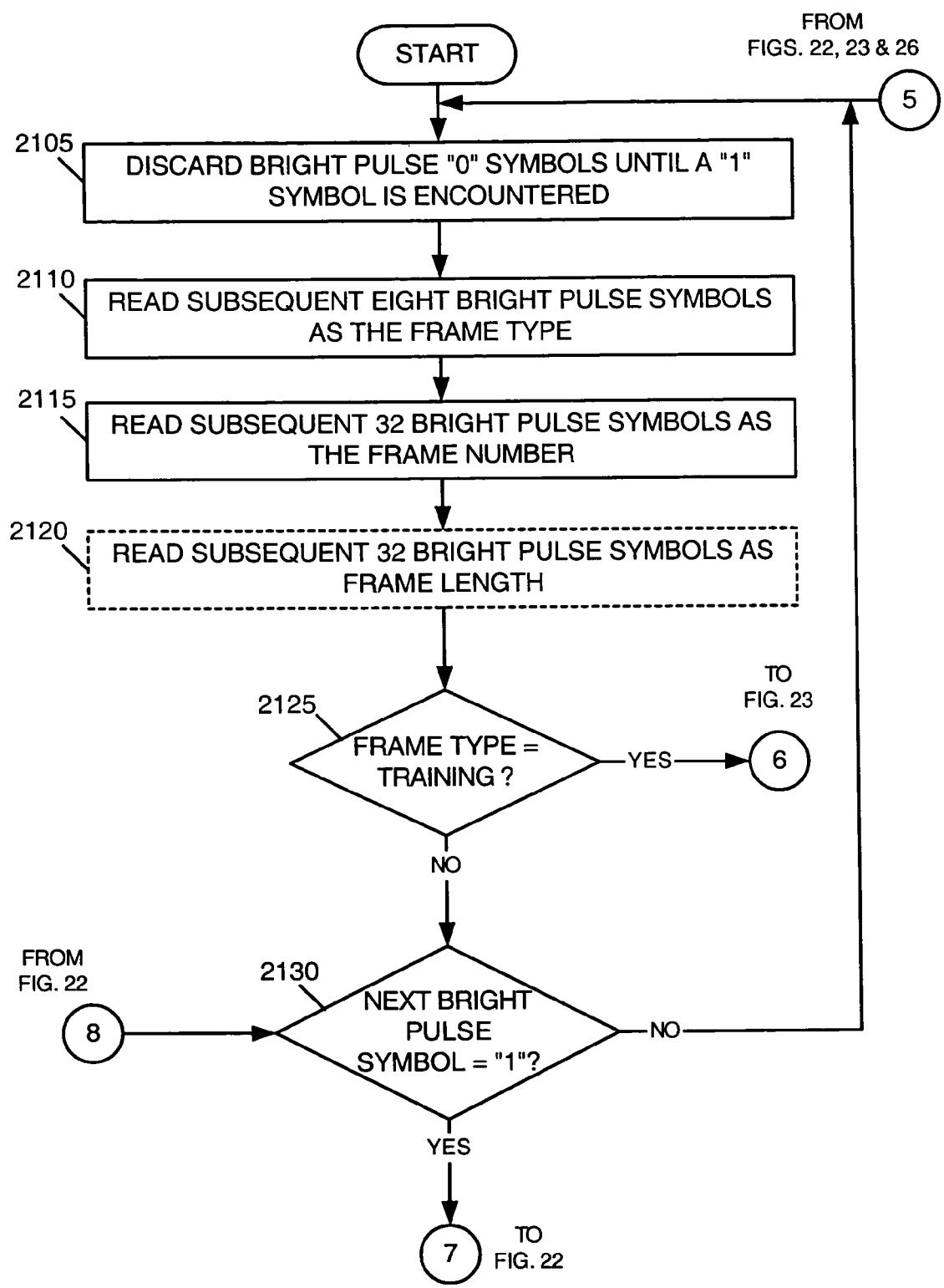
FIGS. 21-26 are flow charts that illustrate an exemplary QKD frame reception and path length control process consistent with the present invention.

A determination may be made whether frame type 1125 indicates that the frame is a training frame [act 1730]. If frame type 1125 indicates that the frame is a data frame, and not a training frame, then bright source 747 may, optionally, transmit symbols that indicate frame length 1135 [act 1735]. For example, bright source 747 may transmit 32 symbols that include a binary encoded frame length value. Bright source 747 may then transmit a single frame payload annunciator pulse 1120 [act 1805](FIG. 18). This annunciator pulse may be used for synchronization timing and for setting a frame boundary (e.g., the first annunciator pulse) for the transmitted payload symbols. A basis value $B_T$ may be randomly chosen by, for example, processing unit 505 [act 1810]. The basis value $B_T$ may indicate whether a cryptographic key symbol will be encoded in a "dim" photon pulse by phase shifting the pulse along a 0–$\pi$ basis or a $\pi/2$–$3\pi/2$ basis. Processing unit 505 may retrieve a cryptographic key symbol [act 1815]. The key symbol may be previously generated according to any conventional encryption key generation algorithm and stored in memory 510. Processing unit 505 may then encode the retrieved key symbol as two symbols S0 and S1 [act 1820]. Thus, a "0" key symbol may be encoded as the symbols "01" and a "1" key symbol may be encoded as the symbols "10." Phase adjuster 725 may phase modulate an output dim pulse from QKD source 705 using basis value $B_T$ and one of the encoded symbol values S0 and S1 retrieved from FIFOs 760 and 755 [act 1825]. For example, if transmitting S0 equal to 0, and the basis value $B_T$ has been chosen as zero, then the outgoing dim pulse can be encoded with a phase shift of 0. As another example, if transmitting S0 equal to 1, and the basis value $B_T$ has been chosen as zero, then the outgoing dim pulse can be encoded with a phase shift of $\pi$. QKD source 705 may transmit, via optical attenuator 710, the phase encoded dim photon pulse a specified interval after transmission of the frame payload annunciator pulse [act 1830].

Processing unit 505 may determine whether the transmitted frame payload annunciator pulse was the last annunciator pulse of frame payload annunciator pulses 1120 [act 1835]. If not, the exemplary process may return to act 1805 with the transmission of the next frame payload annunciator pulse. If the transmitted frame payload annunciator pulse was the last pulse of the frame, then processing unit 505 may increment frame number 1130 [act 1840] and the exemplary process may return to act 1710 above to begin transmission of the next frame.

Returning to act 1730, if processing unit 505 determines that frame type 1125 indicates that the frame is a training frame, then one of a number of different training frame transmission processes may be implemented. In a first exemplary training frame transmission process, described with respect to acts 1905-1950 of FIG. 19, a known sequence of basis and value pairs (known at both the transmitting and receiving QKD endpoints) may be used to transmit dim pulses encoded with training symbols. In a second exemplary training frame transmission process, described with respect to acts 2005-2050 of FIG. 20, a sequence of basis and value pairs may be produced using a current frame number as a seed to an algorithm that generates the sequence.

In the first exemplary training frame transmission process, a counter i is set to "1" [act 1905]. A known sequence of basis ($B_i$) and value ($V_i$) pairs is selected [act 1910]. For example, a repetitive sequence of the following basis and value pairs may be selected: {(0,0), (0,1), (1,0), (1,1)}. In other embodiments, a more complex sequence of basis and value pairs may be selected, such as, for example, a series of all possible permutations of 4-qubit sequences that may exercise unusual cases in a receiving detector's behavior, such as detection probabilities that vary depending on recent history of activity. Furthermore, a known sequence of basis (Bi) and value (Vi) pairs may be associated with each different training frame. A first training frame may have a first known associated sequence $S_1$, a second training frame may have a second known associated sequence $S_2$, and so on. Processing unit 505 may then, optionally, set frame length 1135 to a length n of the known sequence associated with the current frame and transmit the frame length via bright source 747 [act 1915]. For example, bright source 747 may transmit 32 symbols that include a binary encoded frame length value. Processing unit 505 may then encode symbol value $V_i$ as two symbols $S0_i$ and $S1_i$ [act 1920]. Thus, a "0" training symbol may be encoded as the symbols "01" and a "1" training symbol may be encoded as the symbols "10." Bright source 747 may then transmit a single frame payload annunciator pulse 1120 [act 1925]. This annunciator pulse may be used for synchronization timing and for setting a frame boundary (e.g., the first annunciator pulse) for the transmitted payload symbols.

Phase adjuster 725 may phase modulate an output dim pulse from QKD source 705 using basis value $B_i$ and the encoded symbol values $S0_i$ and $S1_i$ [act 1930]. For example, if transmitting S0 equal to 0, and the basis value $B_i$ is zero, then the outgoing dim pulse can be encoded with a phase shift of 0. As another example, if transmitting S0 equal to 1, and the basis value $B_i$ is zero, then the outgoing dim pulse can be encoded with a phase shift of π. QKD source 705 may transmit, via optical attenuator 710, the phase encoded dim photon pulse a specified interval after transmission of the frame payload annunciator pulse [act 1935]. Processing unit 505 may determine whether counter i is equal to the known sequence length n [act 1940]. If not, then counter i may be incremented (i.e., i=i+1) [act 1945] and the exemplary process may return to act 1920 above for transmission of the next training dim pulse. If the counter i is equal to the known sequence length n, then frame number 1130 may be incremented [act 1950] and the exemplary process may return to act 1710 (FIG. 17).

In a second exemplary training frame transmission process, a counter j is set to "1" [act 2005]. Processing unit 505 may use the current frame number 1130 as a seed in an algorithm to generate a sequence of basis ($B_j$) and value ($V_j$) pairs [act 2010]. The algorithm may include a deterministic algorithm, such as a pseudo-random number generator, that generates a sequence of basis and value pairs ($B_j$, $V_j$) from the frame number seed. The algorithm may further include a true random number generator that may work on a variety of principles, such as, for example, passage of a photon through a beam splitter, decaying radioactive atoms, thermal noise, etc. A true random number generator will give a less predictable random number generator that a pseudo-random number generator. The same algorithm may be employed at the transmitting QKD endpoint and the receiving QKD endpoint. In one implementation, for example, bases and symbol values (V) may be computed as a function ($f$) of the training frame number ($F_N$) and the symbol number (s) within a frame in which a training symbol is to be transmitted:

$B=f(F_N,s)$ $V=f(F_N,s)$ where the function ($f$) represents a truly random or pseudo-random function.

Processing unit 505 may then, optionally, set frame length 1135 to a length n of the generated sequence and transmit the frame length via bright source 747 [act 2015]. For example, bright source 747 may transmit 32 symbols that include a binary encoded frame length value. Processing unit 505 may then encode symbol value $V_j$ as two symbols $S0_j$ and $S1_j$ [act 2020]. Thus, a "0" training symbol may be encoded as the symbols "01" and a "1" training symbol may be encoded as the symbols "10." Bright source 747 may then transmit a single frame payload annunciator pulse 1120 [act 2025]. This annunciator pulse may be used for synchronization timing and for setting a frame boundary (e.g., the first annunciator pulse) for the transmitted payload symbols. Phase adjuster 725 may phase modulate an output dim pulse from QKD source 705 using basis value $B_j$ and the encoded symbol values $S0_j$ and $S1_j$ [act 2030]. For example, if transmitting S0 equal to 0, and the basis value $B_j$ is zero, then the outgoing dim pulse can be encoded with a phase shift of 0. As another example, if transmitting S0 equal to 1, and the basis value $B_j$ is zero, then the outgoing dim pulse can be encoded with a phase shift of π. QKD source 705 may transmit, via optical attenuator 710, the phase encoded dim photon pulse a specified interval after transmission of the frame payload annunciator pulse [act 2035]. Processing unit 505 may determine whether counter j is equal to the known sequence length n [act 2040]. If not, then counter j may be incremented (i.e., j=j+1) and the exemplary process may return to act 2020 above for transmission of the next training dim pulse. If the counter j is equal to the known sequence length n, then frame number 1130 may be incremented and the exemplary process may return to act 1710 (FIG. 17).

Exemplary Quantum Cryptographic Frame
Reception and Path Length Control Process

FIGS. 21-26 are flowcharts that illustrate an exemplary process, consistent with the present invention, for receiving and interpreting frames of transmitted symbols and for performing path length control. As one skilled in the art will appreciate, the method exemplified by FIGS. 21-26 can be implemented as a sequence of instructions and stored in memory 510 of QKD endpoint 405 for execution by processing unit 505. Though the exemplary process of FIGS. 21-26 is illustrated as an iterative loop, the process may be stopped, in some implementations, upon transceiver power-down, by way of user control, etc.

The exemplary process may begin with the reception of bright pulses at QKD receiver 610 and the discarding of "0" symbols until a "1" symbol is received at bright pulse detector 810 [act 2105]. The discarded "0" symbols followed by the "1" symbol may indicate interframe mark 1110. Following the "1" symbol, the subsequent eight symbols may be read as the frame type 1125 [act 2110]. Frame type 1125 may indicate whether the frame is a data frame or a training frame. The subsequent 32 symbols may then be read as frame number 1130 [act 2115]. The 32 symbols may, for example, include the frame number as a binary encoded value. In the case of noisy or lossy channels, techniques may be used in order to estimate the frame number 1130 before corruption. Such techniques may include Maximum Likelihood Estimation, or other known techniques, applicable to recovering symbols corrupted in transit in noisy or lossy channels. Optionally, the symbols following the frame number 1130 may be read as frame length 1135 [act 2120]. The frame length symbols of frame length 1135 may include, for example, 32 symbols that include the frame length encoded as a binary encoded value.

Figure 22:
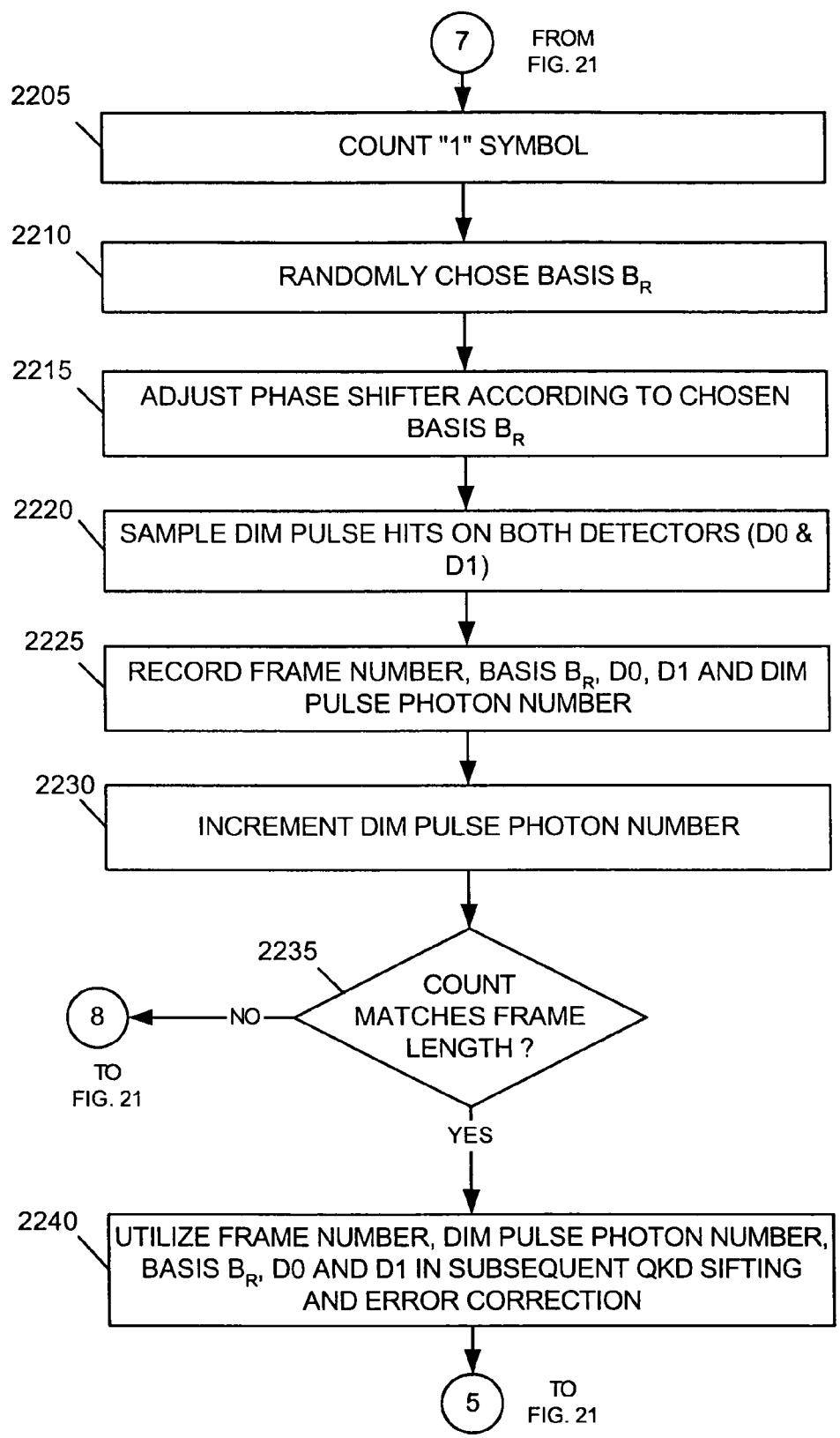

A determination may be made whether frame type 1125 indicates that the frame is a training frame [act 2125]. If not, a determination may then be made whether the next received bright pulse symbol, following the pulses of frame number 1130 or optional frame length 1135, equals the "1" symbol [act 2130]. If not, then the exemplary process may return to act 2105 above. If the next bright pulse symbol equals the "1" symbol, indicating the start of the frame payload, then the "1" symbol may be counted by, for example, processing unit 505 [act 2205](FIG. 22). Processing unit 605 may randomly choose a basis value $B_R$ [act 2210] and may adjust phase adjuster 835, via gain adjust amplifier 886, according to the chosen basis [act 2215]. For example, with a chosen basis value $B_R$ of 0, phase adjuster 835 may adjust the phase of a received dim pulse by zero degrees. With a chosen basis value $B_R$ of 1, for example, phase adjuster 835 may adjust the phase of a received dim pulse by $\pi/2$ degrees.

Dim pulse hits on both detectors (D0) 855 and (D1) 865 may then be sampled to produce values D0 and D1 [act 2220]. A current frame number, basis $B_R$, values D0 and D1, and the dim pulse photon number corresponding to the current received dim photon pulse may be recorded in, for example, memory 510 [act 2225]. The dim pulse photon number may then be incremented [act 2230]. A determination may then be made whether the symbol count (act 2205 above) matches the frame length [act 2235]. For example, if the frame length includes 1024 symbols, the end of the frame will occur when the symbol count equals 1024. If the symbol count does not match the frame length, the exemplary process may return to act 2130 for receipt of the next bright annunciator pulse. If the symbol count matches the frame length, then the frame number, dim pulse photon number, basis $B_R$, and D0 and D1 values may be utilized in subsequent QKD sifting and error correction [act 2240]. QKD sifting and error correction may be performed, for example, according to conventional techniques. The exemplary process may then return to act 2105 to begin the processing of another frame.

Figure 23:
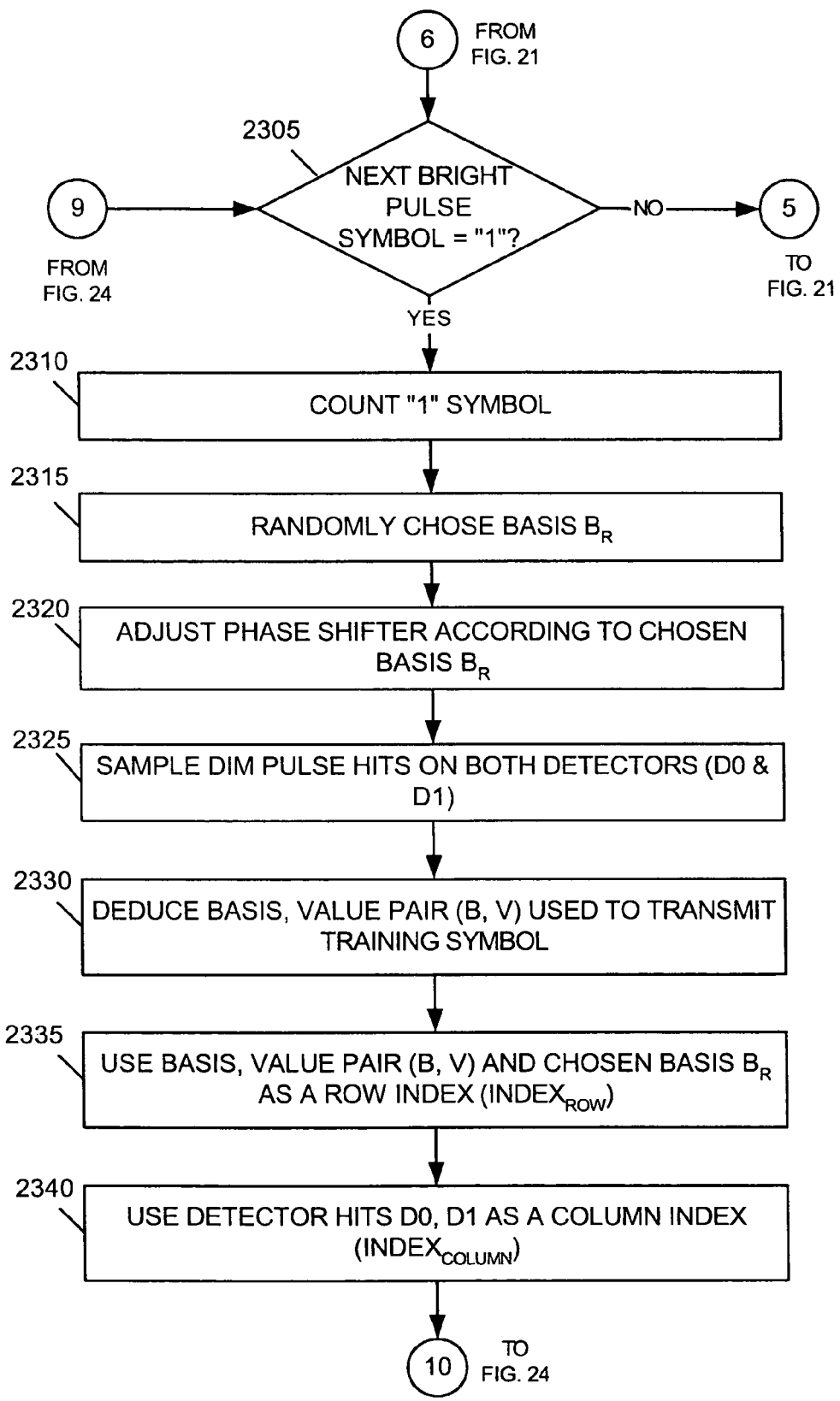

Returning to act 2125, if frame type 1125 indicates that the frame is a training frame, then a determination may then be made whether the next received bright pulse symbol equals the "1" symbol [act 2305](FIG. 23). If not, then the exemplary process may return to act 2105 above. If the next bright pulse symbol equals the "1" symbol, indicating the start of the frame payload, then the "1" symbol may be counted by, for example, processing unit 505 [act 2310]. Processing unit 505 may randomly choose a basis value $B_R$ [act 2315] and may adjust phase adjuster 835, via gain adjust amplifier 886, according to the chosen basis $B_R$ [act 2320]. For example, with a chosen basis value $B_R$ of 0, phase adjuster 835 may adjust the phase of a received dim pulse by zero degrees. With a chosen basis value $B_R$ of 1, for example, phase adjuster 835 may adjust the phase of a received dim pulse by $\pi/2$ degrees. Dim pulse hits on both detectors D0 855 and D1 865 may then be sampled [act 2325]. A basis and symbol value pair (B,V) used to transmit a received training symbol may then be deduced [act 2330]. Processing unit 505, for example, may deduce the basis and value pair by retrieving a corresponding known basis and symbol value pair from memory 510. The basis (B) and symbol value (V) pair may be known to both the transmitting QKD endpoint and the receiving QKD endpoint. As another example, processing unit 605 may deduce the basis and value pair by generating the basis and symbol value pair using an algorithm, such as a truly random or pseudo-random algorithm. In one implementation, for example, a basis and symbol value (V) may be generated as a function ($f$) of the training frame number ($F_N$) and the symbol number (s) within a frame in which a training symbol is received:

$B=f(F_N,s)$ $V=f(F_N,s)$ where the function ($f$) represents a truly random or pseudo-random function.

The same algorithm may be employed at the transmitting QKD endpoint and the receiving QKD endpoint.

Figure 24:
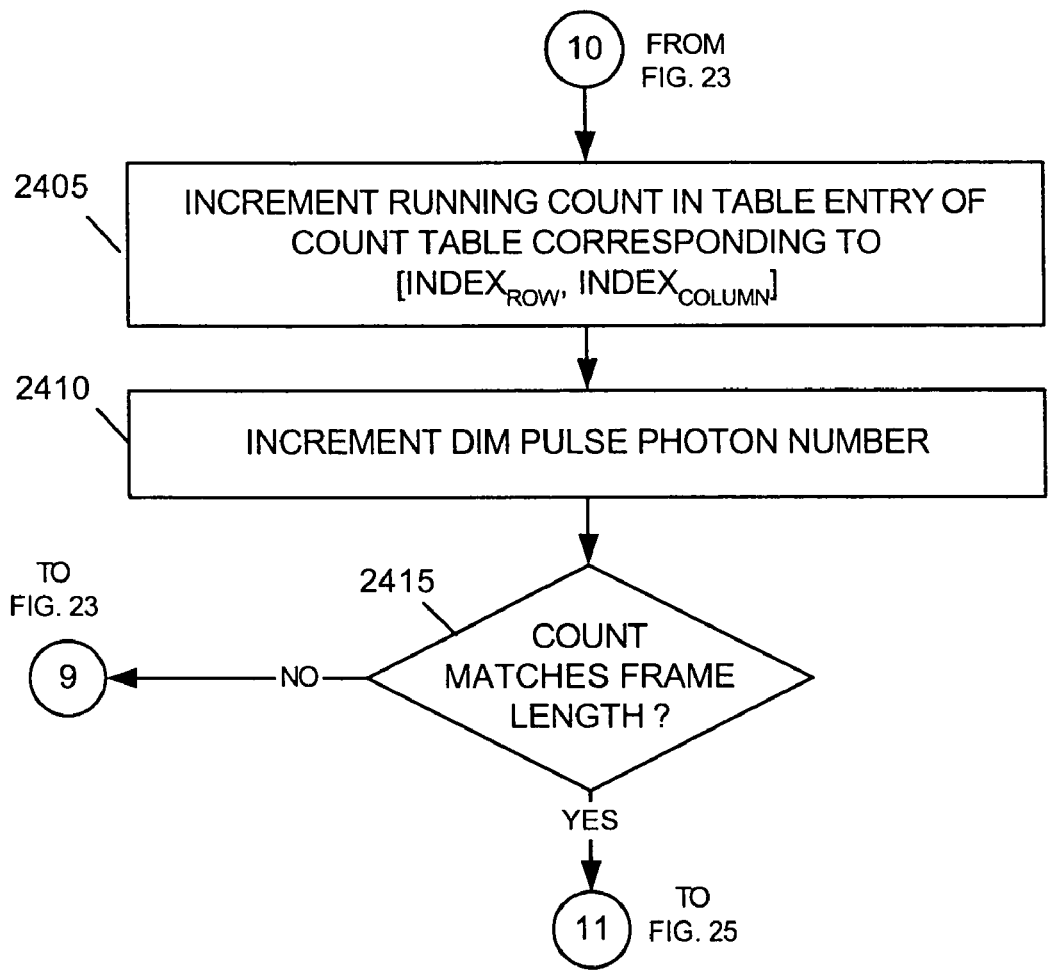

Processing unit 505 may then use the deduced basis and symbol value pair (B, V) and the chosen basis $B_R$, used to detect the training symbol (see act 2315 above), as a row index ($INDEX_{ROW}$) for count table 1300 [act 2335]. Processing unit 505 may further use detector hits at detectors D0 855 and D1 865 as a column index ($INDEX_{COLUMN}$) for count table 1300 [act 2340]. Processing unit 505 may then increment a running count in a table entry of count table 1300 that corresponds to the row index and column index ($INDEX_{ROW}$, $INDEX_{COLUMN}$) [act 2405](FIG. 24). For example, if a basis and symbol value pair of (0, 0) is deduced, a basis value $B_R$ of 0 is used to detect an incoming dim pulse, and no hits were detected on either of the D0 APD 855 or D1 APD 865, then the table entry in row=1 and column=1 of count table 1300 would be incremented. As another example, if a basis and symbol value pair of (1,1) is deduced, a basis value $B_R$ of 1 is used to detect an incoming dim pulse, and hits at both of the D0 APD 855 and the D1 APD 865 were detected, then the table entry in row=8 and column=4 of count table 1300 would be incremented. Each entry of count table 1300, thus, keeps a running count of how many times a particular combination of events has occurred.

The dim pulse photon number may then be incremented [act 2410]. A determination may then be made whether the symbol count (see act 2310 above) matches the frame length [act 2415]. For example, if the frame length includes 1024 symbols, the end of the frame will occur when the symbol count equals 1024. If the symbol count does not match the frame length, the exemplary process may return to act 2305 for receipt of the next bright annunciator pulse. If the symbol count matches the frame length, then the results stored in count table 1300 may be used to perform a path length control process as described with respect to FIGS. 25-26 below. The results in count table 1300 may, for example, be statistically analyzed at the end of a current training frame, after some number of training frames, or at periodic intervals for performing the exemplary path length control process described with respect to FIGS. 25-26 below.

Figure 25:
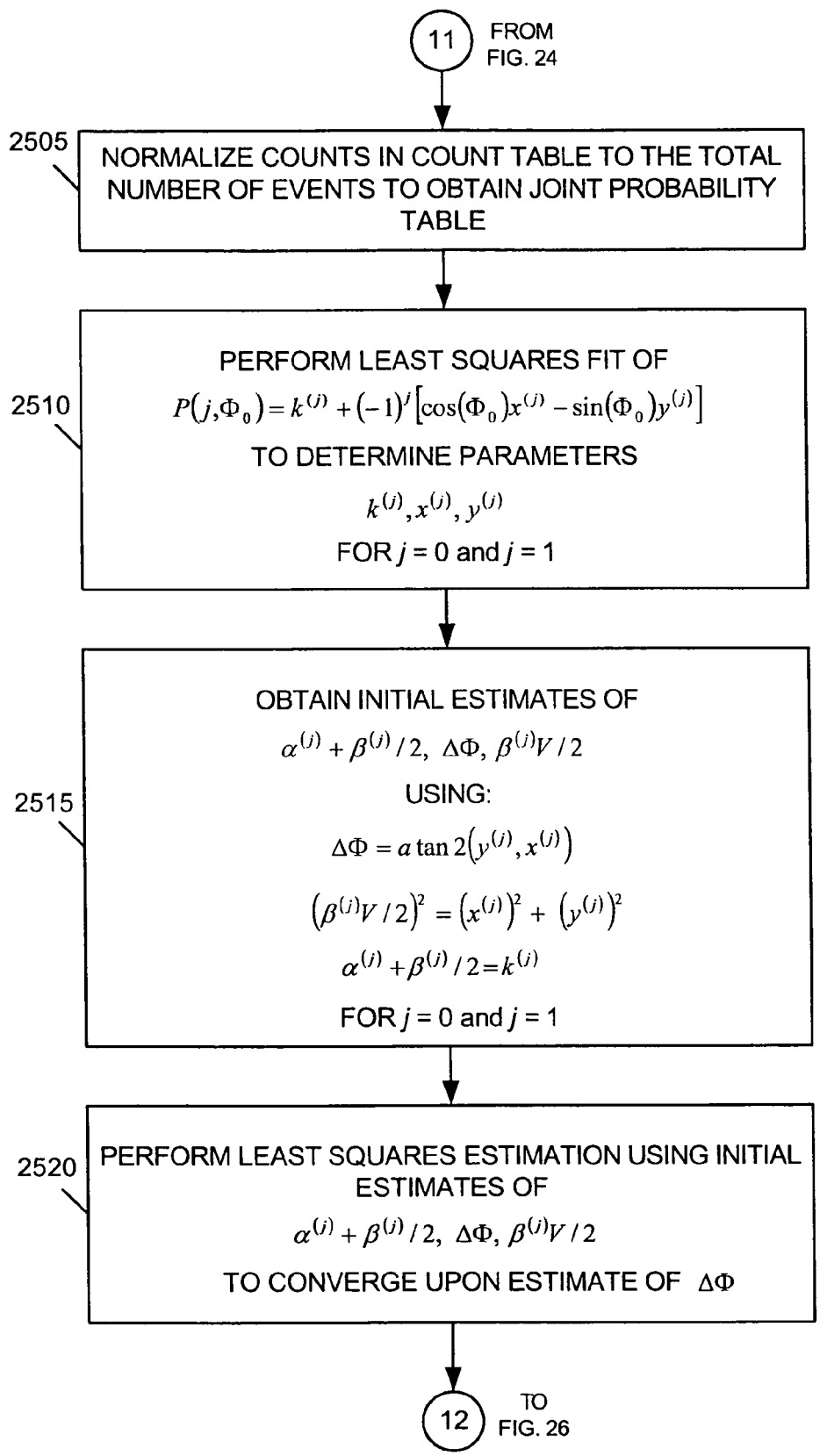
Figure 26:
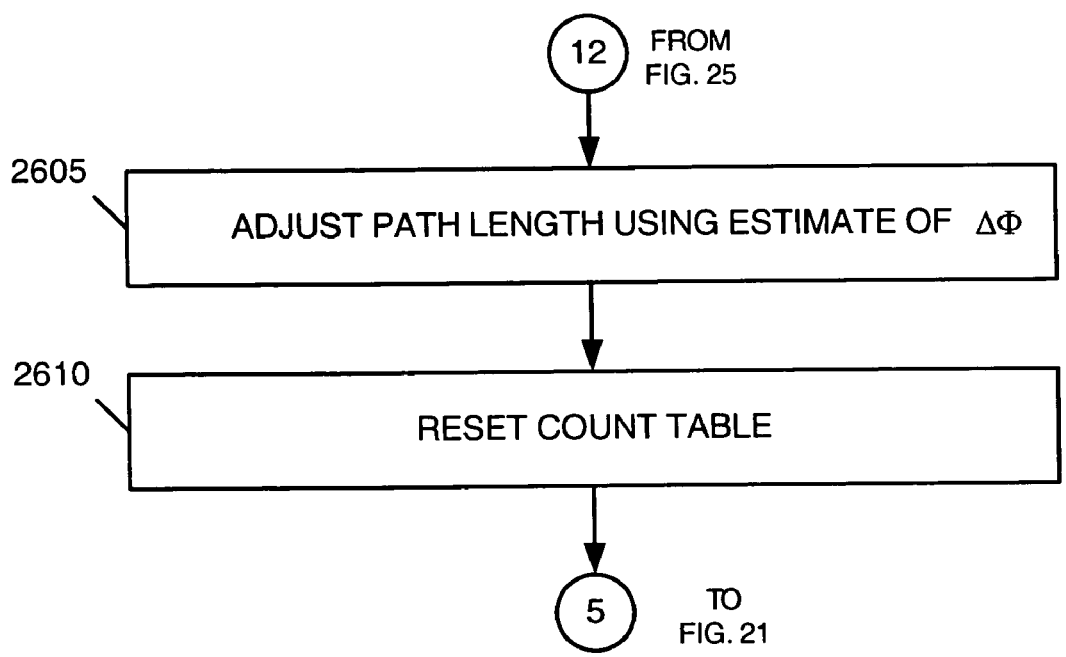

The exemplary path length control process may begin with the normalization of counts in count table 1300, to the total number of events, to obtain an updated joint probability table 1400 [act 2505](FIG. 25). Thus, if, for example, the total number of events equals 100, then the counts contained in row 1 and column 1 of count table 1300 may be divided by 100 and the result stored in joint probability table 1400 at the intersection of event $A_0$ 1405 and event $B_0$ 1425 as the probability of the intersection of event $A_0$ and event $B_0 P(A_0 \cap B_0)$. As another example, the counts contained in row 3 and column 2 of count table 1300 may be divided by 100 and the result stored in joint probability table 1400 at the intersection of event $A_2$ and event $B_1$ as the probability of the intersection of event $A_2$ and event $B_1 P(A_2 \cap B_1)$.

Ignoring the case when two photons are emitted from QKD source 705, the probabilities of events $B_1$ and $B_2$ can be modeled from the parameters of the system as follows:

$$P(B_1|\Phi = \Phi_0 + \Delta\Phi) = P(D0 = 1 \cap D1 = 0|\Phi = \Phi_0 + \Delta\Phi) = \quad \text{Eqn. (1)}$$
$$\alpha^{(0)} + \beta^{(0)} \frac{1 + V\cos(\Phi_0 + \Delta\Phi)}{2}$$

$$P(B_2|\Phi = \Phi_0 + \Delta\Phi) = P(D0 = 0 \cap D1 = 1|\Phi = \Phi_0 + \Delta\Phi) = \quad \text{Eqn. (2)}$$
$$\alpha^{(1)} + \beta^{(1)} \frac{1 - V\cos(\Phi_0 + \Delta\Phi)}{2}$$

where parameters $\alpha(j)$, $\beta(j)$ and V are offset, scale and visibility parameters of the system that do not depend on $\Phi_0$ or $\Delta\Phi$. The conditional probability $P(B_j|\Phi=\Phi_0+\Delta\Phi)$ on the left side of equations (1) and (2) can be determined as the ratio of the joint probabilities:

$$P(B_j|A_m)=P(B_j \cap A_m)/P(A_m) \quad \text{Eqn. (3)}$$

wherein $A_m$ is one of the disjoint events $A_0 \ldots A_7$, each corresponding to the specific total phase shift of both interferometers, $\Phi_0+\Delta\Phi$. Eqns. (1) and (2), thus, produce sixteen non-linear equations, eight for the detection event $B_1$ (i.e., the intersection of event $B_1$ with events $A_0$ through $A_7$ in joint probability table 1400) and eight for the detection event $B_2$ (i.e., the intersection of event $B_2$ with events $A_0$ through $A_7$ in joint probability table 1400), with five unknown parameters $\alpha^{(o)}+\beta^{(o)}/2$, $\alpha^{(1)}+\beta^{(1)}/2$, $\beta^{(o)}V/2$, $\beta^{(1)}V/2$ and $\Delta\Phi$, and one input variable $\Phi_0$.

An estimate of $\Delta\Phi$ may be obtained using conventional least squares estimation algorithms and Eqns. (1), (2) and (3). Convention least squares estimation may include an interative method that starts with an initial guess of the unknown parameters $\alpha^{(o)}+\beta^{(o)}/2$, $\alpha^{(1)}+\beta^{(1)}/2$, $\beta^{(o)}V/2$, $\beta^{(1)}V/2$ and $\Delta\Phi$ of Eqns (1), (2) and (3). Each iteration may then adjust the current guess until the algorithm converges, minimizing the sum of the squared differences between the observed responses (i.e., normalized probabilities from joint probability table 1400) and their fitted values. In one implementation, a Gauss-Newton method with Levenberg-Marquardt modifications for global convergence may be used for performing least squares estimation. One skilled in the art will recognize, however, that other techniques may be used for estimating $\Delta\Phi$, including (but not limited to), using Kalman filters or robust least squares estimates such as least absolute residuals or Bisquare weights.

In order to determine the initial estimate of the unknown parameters $\alpha^{(o)}+\beta^{(o)}/2$, $\alpha^{(1)}+\beta^{(1)}/2$, $\beta^{(o)}V/2$, $\beta^{(1)}V/2$ and $\Delta\Phi$, Eqns. (1) and (2) can be generalized to the following:

$$P(j, \Phi_0) = \alpha^{(j)} + \beta^{(j)} \frac{1 + (-1)^j V\cos(\Phi_0 + \Delta\Phi)}{2} \quad \text{Eqn. (4)}$$

$$= \alpha^{(j)} + \beta^{(j)} \frac{1 + (-1)^j V[\cos(\Phi_0)\cos(\Delta\Phi) - \sin(\Phi_0)\sin(\Delta\Phi)]}{2} \quad \text{Eqn. (5)}$$

$$= k^{(j)} + (-1)^j [\cos(\Phi_0)x^{(j)} - \sin(\Phi_0)y^{(j)}] \quad \text{Eqn. (6)}$$

where $$x^{(j)}=V\beta^{(j)}\cos(\Delta\Phi)/2, \quad \text{Eqn. (7)}$$

$$y^{(j)}=V\beta^{(j)}\sin(\Delta\Phi)/2, \quad \text{Eqn. (8)}$$

$$k^{(j)}=\alpha^{(j)}+\beta^{(j)}/2, \quad \text{Eqn. (9)}$$

and j=0, 1 is the index of the detection events equal to 0 for $B_1$ and 1 for $B_2$ events. A least squares fit of Eqn. (6) may be performed, using conventional estimation techniques, to determine parameters $k^{(j)}$, $x^{(j)}$ and $y^{(j)}$ for j=0 and j=1 [act 2510]. The initial estimates of the unknown parameters $\alpha^{(o)}+\beta^{(o)}/2$, $\alpha^{(1)}+\beta^{(1)}/2$, $\beta^{(o)}V/2$, $\beta^{(1)}V/2$ and $\Delta\Phi$ may then be obtained, using the determined parameters $k^{(j)}$, $x^{(j)}$ and $y^{(j)}$, from the following:

$$\Delta\Phi=\alpha\tan 2(y^{(j)},x^{(j)}) \quad \text{Eqn. (10)}$$

$$(\beta^{(j)}V/2)^2=(x^{(j)})^2+(y^{(j)})^2 \quad \text{Eqn. (11)}$$

$$\alpha^{(j)}+\beta^{(j)}/2=k^{(j)} \quad \text{Eqn. (12)}$$

for j=0 and j=1. Since $\Delta\Phi$ is a common parameter for both detectors, two initial guesses are available. The fit with a smaller residual is more accurate and, thus, would be a better candidate for the initial estimate. The initial estimates only have to be completed once. For consecutive estimation, the previous estimate of the parameters may be used.

An estimation may be performed, using the initial estimates of $\alpha^{(o)}+\beta^{(o)}/2$, $\alpha^{(1)}+\beta^{(1)}/2$, $\beta^{(o)}V/2$, $\beta^{(1)}V/2$ and $\Delta\Phi$ obtained in act 2515 above, to converge upon a final estimate of $\Delta\Phi$ [act 2520]. The estimation may include, for example, an iterative least squares estimation algorithm that starts with the initial estimates of the unknown parameters $\alpha^{(o)}+\beta^{(o)}/2$, $\alpha^{(1)}+\beta^{(1)}/2$, $\beta^{(o)}V/2$, $\beta^{(1)}V/2$ and $\Delta\Phi$ and then adjusts a current guess of the unknown parameters until the algorithm converges, minimizing the sum of the squared differences between the observed responses (i.e., normalized probabilities from joint probability table 1400) and their fitted values. In one implementation, a Gauss-Newton method with Levenberg-Marquardt modifications for global convergence may be used for performing the least squares estimation. After converging upon an estimate of $\Delta\Phi$, the estimate may be used to adjust the path length of the QKD system [act 2605]. The phase error $\Delta\Phi$ may then be compensated dynamically, by employing path length control feedback system 1600 to adjust phase shifting element 840 to expand or contract the effective path length such that $\Delta\Phi=0$. In one implementation in which phase shifting element 840 includes, for example, a fiber stretcher, the phase error $\Delta\Phi$ may be compensated by employing path length control feedback system 1600 to adjust the voltage of the fiber stretcher, thus, expanding or contracting the fiber length. In another implementation in which phase shifting element 1630 includes, for example, a phase modulator, the phase error ΔΦ may be compensated by employing path length control feedback system 1600 to adjust the voltage of the phase modulator to expand or contract the fiber length. After the path length is adjusted, count table 1300 may be reset to zero [act 2610], and the process of count accumulation may continue.

CONCLUSION

Systems and methods consistent with the present invention implement path length control in a quantum cryptographic system to mitigate the effects of thermal and acoustic fluctuations that may adversely affect the transmission of QKD symbols across a QKD link. The path length control process, consistent with the present invention, employs a feedback system, that uses training symbols as an input for continuously and automatically controlling the path length through a QKD link. Through use of the feedback system for controlling the path length, QBER may be reduced and proper operation of the link may be ensured.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in software and others in hardware, other configurations may be possible. Furthermore, while wavelength division multiplexing of the bright and dim pulses has been described above, time division multiplexing may be used, alternatively, or in conjunction with wavelength division multiplexing, for transmitting the bright and dim pulses over the quantum cryptographic link (e.g., bright pulses alternating with dim pulses in a time division manner). Additionally, while exemplary embodiments of the present invention have been described as using optical QKD pulses (i.e., photon pulses) for encoding and transmitting cryptographic keys, it will be appreciated that other non-optical pulses that include, for example, individual atoms, electrons, etc., may alternatively be used. In embodiments employing non-optical pulses, the individual quantum particles (e.g., atoms, electrons) may be modulated to encode cryptographic key symbols.

While series of acts has been described with regard to FIGS. 17-26, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method of controlling path length in a quantum cryptographic key distribution (QKD) system, performed by a QKD endpoint device, the method comprising:
receiving, using a transceiver of the QKD endpoint device, a signal identifying a plurality of symbols as training symbols over a QKD path;
receiving, using the transceiver, the plurality of training symbols transmitted from a QKD transmitter over the QKD path via quantum cryptographic mechanisms;
determining, using a processing unit of the QKD endpoint device, probabilities of detection events associated with the received plurality of training symbols;
estimating, using the processing unit, a phase error associated with transmission of the plurality of training symbols over the QKD path, the estimating being based on the determined probabilities; and
controlling, using the processing unit, a length of the QKD path based on the estimated phase error.

2. The method of claim 1, where estimating the phase error comprises:
performing a least squares estimation of the phase error using the determined probabilities.

3. The method of claim 1, where estimating the phase error comprises:
employing at least one Kalman filter to estimate the phase error.

4. The method of claim 1, where estimating the phase error comprises:
performing a robust least squares estimation of the phase error using the determined probabilities.

5. The method of claim 4, where the robust least squares estimation comprises at least one of least absolute residuals and Bisquare weights.

6. A system configured to automatically initialize a length of a quantum cryptographic key distribution (QKD) path in a QKD system, comprising:
a QKD receiver configured to determine whether training symbols are to be received and to receive training symbols from a QKD transmitter over the QKD path;
a phase shifting element disposed on the QKD path; and
processing logic configured to:
determine probabilities of detection events associated with received training symbols;
estimate, using a least squares estimation, a phase error associated with transmission of the received training symbols over the QKD path based on the determined probabilities; and
automatically initialize the length of the QKD path, using the phase shifting element, based on the estimated phase error.

7. A computer-readable memory device containing instructions configured to control at least one processor to perform a method of controlling path length in a quantum cryptographic key distribution (QKD) system, the method comprising:
receiving a signal identifying a plurality of symbols as training symbols over a QKD path;
receiving the plurality of training symbols transmitted from a QKD transmitter over the QKD path via quantum cryptographic mechanisms;
determining probabilities of detection events associated with the received plurality of training symbols;
estimating a phase error associated with transmission of the plurality of training symbols over the QKD path based on the determined probabilities, the estimating being performed using at least one of least absolute residuals or Bisquare weights; and
controlling a length of the QKD path based on the estimated phase error.

8. A method of automatically controlling a path length in a quantum cryptographic key distribution system, the path comprising a first interferometer and a second interferometer, the method comprising:

employing a phase shifting element in the second interferometer;

determining, using a processing unit of the system, probabilities of detection events associated with training symbols transmitted over the path, where the training symbols were distinguished from other types of symbols transmitted over the path;

estimating, using the processing unit, a phase error based on a least squares estimation using the determined probabilities; and automatically adjusting, using the processing unit, the phase shifting element to control the path length based on the estimated phase error.

9. The method of claim 8, where the phase shifting element comprises a fiber stretcher.

10. The method of claim 9, where automatically adjusting the phase shifting element comprises:

adjusting a voltage applied to the fiber stretcher based on the training symbols transmitted over the path.

11. The method of claim 8, where the phase shifting element comprises a phase modulator.

12. The method of claim 11, where automatically adjusting the phase shifting element comprises:

adjusting a voltage applied to the phase modulator based on the training symbols transmitted over the path.

13. A system configured to automatically control a path length in a quantum cryptographic key distribution (QKD) system, comprising:

a QKD path including a first interferometer and a second interferometer;

a phase shifting element disposed in at least one of the first and second interferometers; and processing logic configured to:

determine probabilities of detection events associated with received training symbols, where the training symbols were distinguished from other types of received symbols;

estimate a phase error associated with the training symbols, using at least one of least absolute residuals or Bisquare weights applied to the determined probabilities; and automatically adjust the phase shifting element to control a length of the path based on training symbols transmitted over the QKD path via quantum cryptographic mechanisms based on the estimated phase error.

14. A method of automatically controlling a path length in a quantum cryptographic key distribution (QKD) system, comprising:

employing a feedback system in the QKD system, where the QKD system comprises a first interferometer and a second interferometer;

receiving, using a transceiving unit of the QKD system, training symbols transmitted over the path from the first interferometer to the second interferometer via quantum cryptographic mechanisms, where the training symbols are distinguished from data symbols;

determining, using a processing unit of the QKD system, probabilities of detection events associated with the training symbols transmitted over the path;

employing, using the processing unit, at least one Kalman filter to estimate a phase error associated with the training symbols based on the determined probabilities; and automatically controlling the path length, using the feedback system, based on the estimated phase error.

15. The method of claim 14, where the feedback system comprises a phase shifting element.

16. The method of claim 15, where the phase shifting element comprises a fiber stretcher.

17. The method of claim 16, where automatically controlling the path length comprises:

adjusting a voltage applied to the fiber stretcher based on the training symbols transmitted over the path.

18. The method of claim 15, where the phase shifting element comprises a phase modulator.

19. The method of claim 18, where automatically controlling the path length comprises:

adjusting a voltage applied to the phase modulator based on the training symbols transmitted over the path.

20. A quantum cryptographic key distribution (QKD) endpoint device, comprising:

a QKD receiver configured to:

receive symbols transmitted over a QKD path via quantum cryptographic mechanisms, and distinguish training symbols from data symbols in the received symbols; and a feedback system configured to:

determine probabilities of detection events associated with the training symbols;

estimate, using at least one of absolute residuals or Bisquare weights, a phase error associated with the training symbols based on the determined probabilities; and control a length of the QKD path based on the estimated phase error.

21. The QKD endpoint of claim 20, where the feedback system comprises a phase shifting element.

22. The QKD endpoint of claim 21, where the phase shifting element comprises a fiber stretcher.

23. The QKD endpoint of claim 21, where the phase shifting element comprises a phase modulator.

24. A method of controlling a path length in a quantum cryptographic key distribution (QKD) system, comprising:

receiving, using a transceiving unit of the QKD system, one or more symbols that indicate that a subsequent sequence of symbols comprises training symbols;

determining, using a processing unit of the QKD system, probabilities associated with a plurality of detection events, the plurality of detection events being associated with the training symbols received over a path in the QKD system via quantum cryptographic mechanisms;

estimating, using the processing unit, a phase error based on the determined probabilities and by performing a robust least squares estimation using at least one of absolute residuals or Bisquare weights; and controlling, using the processing unit, a length of the path based on the estimated phase error.

25. The method of claim 24, where the probabilities comprise conditional probabilities.

26. A quantum cryptographic key distribution (QKD) endpoint device, comprising:

a QKD receiver configured to:

receive a sequence of symbols transmitted over a QKD path via quantum cryptographic mechanisms, and determine whether the sequence of symbols corresponds to a sequence of training symbols;

a phase shifting element disposed on the QKD path; and processing logic configured to:

determine, based on determining that the sequence of symbols corresponds to a sequence of training symbols, conditional probabilities associated with a plurality of detection events, the plurality of detection events being associated with the sequence of symbols, estimate, using at least one Kalman filter, a phase error associated with the sequence of training symbols based on the determined conditional probabilities and adjust the phase shifting element to control a length of the QKD path based on the estimated phase error.

27. A computer-readable memory device containing instructions configured to control at least one processor to perform a method of controlling a path length in a quantum cryptographic key distribution (QKD) system, the method comprising:

receiving one or more symbols that indicate that a subsequent sequence of symbols comprises training symbols;

determining probabilities associated with a plurality of detection events, the plurality of detection events being associated with the training symbols received over a path in the QKD system via quantum cryptographic mechanisms;

estimating a phase error for the plurality of detection events, the phase error being estimated based on the determined probabilities using a least squares estimation; and controlling a length of the path based on the estimated phase error.

28. A system configured to control a path length in a quantum cryptographic key distribution (QKD) system, comprising:

means for receiving one or more symbols that indicate that a subsequent sequence of symbols comprises training symbols;

means for determining probabilities associated with a plurality of detection events, the plurality of detection events being associated with the training symbols received over a path in the QKD system via quantum cryptographic mechanisms;

means for estimating a phase error for the plurality of detection events the phase error being estimated based on the determined probabilities using a least squares estimation; and means for controlling a length of the path based on the estimated phase error.

* * * * *

UNITED STATES PATENT AND TRADEMARK OFFICE
CERTIFICATE OF CORRECTION

PATENT NO.        : 7,627,126 B1
APPLICATION NO. : 10/716078
DATED             : December 1, 2009
INVENTOR(S)       : Pikalo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1238 days.

Signed and Sealed this

Twenty-first Day of December, 2010

David J. Kappos
*Director of the United States Patent and Trademark Office*